(12) United States Patent
Sawyer et al.

(10) Patent No.: US 11,336,579 B2
(45) Date of Patent: May 17, 2022

(54) PREDICTIVE ANYCAST TRAFFIC SHAPING

(71) Applicant: Verizon Digital Media Services Inc., Dulles, VA (US)

(72) Inventors: Derrick Sawyer, Santa Clarita, CA (US); Marcel Eric Schechner Flores, Los Angeles, CA (US); Carl Tewksbury, Venice, CA (US); Sree Priyanka Uppu, Los Angeles, CA (US); Stephen McQuistin, Kilwinning (GB)

(73) Assignee: Edgecast Inc., Dulles, VA (US)

( * ) Notice: Subject to any disclaimer, the term of this patent is extended or adjusted under 35 U.S.C. 154(b) by 68 days.

(21) Appl. No.: 16/867,160

(22) Filed: May 5, 2020

(65) Prior Publication Data

US 2020/0267086 A1 Aug. 20, 2020

Related U.S. Application Data

(63) Continuation of application No. 16/211,628, filed on Dec. 6, 2018, now Pat. No. 10,645,008.

(51) Int. Cl.
| | |
|---|---|
| *G06F 15/173* | (2006.01) |
| *H04L 47/22* | (2022.01) |
| *H04L 45/74* | (2022.01) |
| *H04L 61/4511* | (2022.01) |
| *H04L 45/028* | (2022.01) |
| *H04L 12/66* | (2006.01) |

(52) U.S. Cl.
CPC ............ *H04L 47/22* (2013.01); *H04L 45/028* (2013.01); *H04L 45/74* (2013.01); *H04L 61/1511* (2013.01); *H04L 12/66* (2013.01)

(58) Field of Classification Search
CPC ....... H04L 47/22; H04L 45/028; H04L 45/74; H04L 61/1511; H04L 12/66
USPC .......................................................... 709/223
See application file for complete search history.

(56) References Cited

U.S. PATENT DOCUMENTS

| | | | |
|---|---|---|---|
| 6,785,704 B1 | 8/2004 | McCanne | |
| 7,313,631 B1 | 12/2007 | Sesmun et al. | |
| 7,979,580 B2 | 7/2011 | Swildens et al. | |

(Continued)

OTHER PUBLICATIONS

European Search Report for EP18192604, dated Mar. 26, 2019, 13 pages.

*Primary Examiner* — Atta Khan
(74) *Attorney, Agent, or Firm* — Ansari Katiraei LLP; Arman Katiraei; Sadiq Ansari

(57) ABSTRACT

Gateway devices at different sites of a primary Anycast network provide access to the sites by advertising a first set of Anycast addresses. A secondary shadow Anycast network advertises different second sets of Anycast addresses from the different sites in order to predetermine traffic shifts that occur as a result of changing one or more of the second set of Anycast addresses that are advertised from one or more of the sites. A traffic shifting device may implement a predetermined traffic shift in the primary Anycast network by selecting a particular second set of network addresses that produces a traffic shift at least equal to the predetermined traffic shift, mapping the particular second set of network addresses to a modified first set of addresses, and modifying routing in the primary Anycast network by advertising the modified first set of addresses instead of the first set of addresses.

20 Claims, 15 Drawing Sheets

(56) References Cited

U.S. PATENT DOCUMENTS

| | | |
|---|---|---|
| 8,606,938 B1 | 12/2013 | Chong et al. |
| 8,745,177 B1 | 6/2014 | Kazerani et al. |
| 9,467,506 B2 * | 10/2016 | Kontothanassis ... H04L 67/1002 |
| 9,774,619 B1 | 9/2017 | Radlein et al. |
| 9,923,959 B2 | 3/2018 | Flavel et al. |
| 10,142,240 B1 | 11/2018 | Mathews et al. |
| 2003/0079027 A1* | 4/2003 | Slocombe ......... H04L 29/12066 709/217 |
| 2005/0071469 A1 | 3/2005 | McCollom et al. |
| 2008/0235400 A1 | 9/2008 | Slocombe et al. |
| 2009/0113057 A1 | 4/2009 | Van Der Merwe et al. |
| 2009/0327489 A1 | 12/2009 | Swildens et al. |
| 2011/0153941 A1* | 6/2011 | Spatscheck ........... G06F 9/5083 711/119 |
| 2015/0040173 A1 | 2/2015 | Panagos et al. |
| 2015/0215388 A1 | 7/2015 | Kontothanassis et al. |
| 2015/0334179 A1* | 11/2015 | Eisenbud ............ H04L 67/1023 709/226 |
| 2017/0055104 A1 | 2/2017 | Wegelin et al. |
| 2017/0134274 A1 | 5/2017 | Araujo |
| 2017/0163755 A1* | 6/2017 | Slocombe ............... H04L 29/06 |
| 2017/0257294 A1 | 9/2017 | Santoro et al. |
| 2018/0295063 A1 | 10/2018 | Flores et al. |
| 2019/0132281 A1 | 5/2019 | Sawyer et al. |

* cited by examiner

810 →

| Site1 Address Change | Site2 Address Change | Site3 Address Change | Site1 Traffic Shift | Site2 Traffic Shift | Site3 Traffic Shift |
|---|---|---|---|---|---|
| +172.2.2.10/29 | No Change | No Change | AS2=+5%(+3ms); AS6=+10%(+4ms); | AS5=-15% | No Change |
| -172.2.1.0/24 | No Change | No Change | AS2=-10%; AS4=-5%; AS6=-5% | AS3=+10%(+6ms); AS5=+10%(+5ms); | No Change |
| -172.2.1.0/24 | -172.2.1.0/24 | No Change | AS2=-10%; AS4=-5%; AS6=-5% | AS3=-20%; AS5=-30% | AS9=+30%(+10ms); AS10=+40%(+15ms); |
| -172.2.1.0/24 | No Change | -172.2.1.0/24 | -1.1.1.0/24 | +1.1.1.0/24(+7ms) +2.2.2.0/24(+5ms) | -2.2.2.0/24 |

PREDICTIVE ANYCAST TRAFFIC SHAPING

CLAIM OF BENEFIT TO RELATED APPLICATIONS

This application is a continuation of U.S. nonprovisional application Ser. No. 16/211,628 entitled "Predictive Anycast Traffic Shaping", filed Dec. 6, 2018, now U.S. Pat. No. 10,645,008. The contents of application Ser. No. 16/211,628 are hereby incorporated by reference.

BACKGROUND ART

Anycast is a network addressing and routing methodology whereby the same network addressing is advertised from two or more different network locations. FIG. 1 conceptually illustrates an Anycast based network architecture. There are two different network sites, also referred to as points-of-presence ("PoPs") 110 and 120, from which one or more servers provide different requesting clients with access to the same and/or different content, services, and/or data.

Each PoP 110 and 120 advertises that it is accessible at the same Internet Protocol ("IP") address. In particular, the gateway router at each PoP 110 and 120 distributes Border Gateway Protocol ("BGP") advertisement messages (i.e., BGP update messages) to neighboring network routers. The advertisements convey the number of hops to an address through a sequence of Autonomous System ("AS") identifiers and/or other identifiers. The advertisement messages identify the same IP addressing for reaching each PoP 110 and 120.

The other network routers receive the advertisements and build routing or forwarding tables that identify the shortest path to each advertised address. Thus, when a request directed to the Anycast address advertised from PoPs 110 and 120 is received by router 130, router 130 identifies PoP 110 as the closest destination, and routes the request to PoP 110. When a request directed to the Anycast address advertised from PoPs 110 and 120 is received by router 140, router 140 identifies PoP 120 as the closest destination, and routes the request to PoP 120 instead of PoP 110.

Anycast involves relinquishing control of the routing to the network and/or routers along the network paths to PoPs 110 and 120. As a result, Anycast does not allow for deterministic shifting of a specific subset or a specific amount of traffic from one Anycast site to other specifically selected Anycast sites. For instance, pulling advertisements of one or more Anycast addresses from the gateway router of a site is one manner to shift traffic away from that site. However, the amount of traffic, load, and/or clients that are shifted from the site, and the one or more destination sites that receive the shifted traffic, load, and/or clients are not deterministically controllable.

BRIEF DESCRIPTION OF THE DRAWINGS

FIG. 8 conceptually illustrates a traffic shifting table that tracks different advertised address changes for the secondary shadow Anycast network, the traffic, load, and/or client shifts that resulted from each address change, and/or the performance characteristics associated with each shift in accordance with some embodiments described herein.

DETAILED DESCRIPTION

Figure 1:
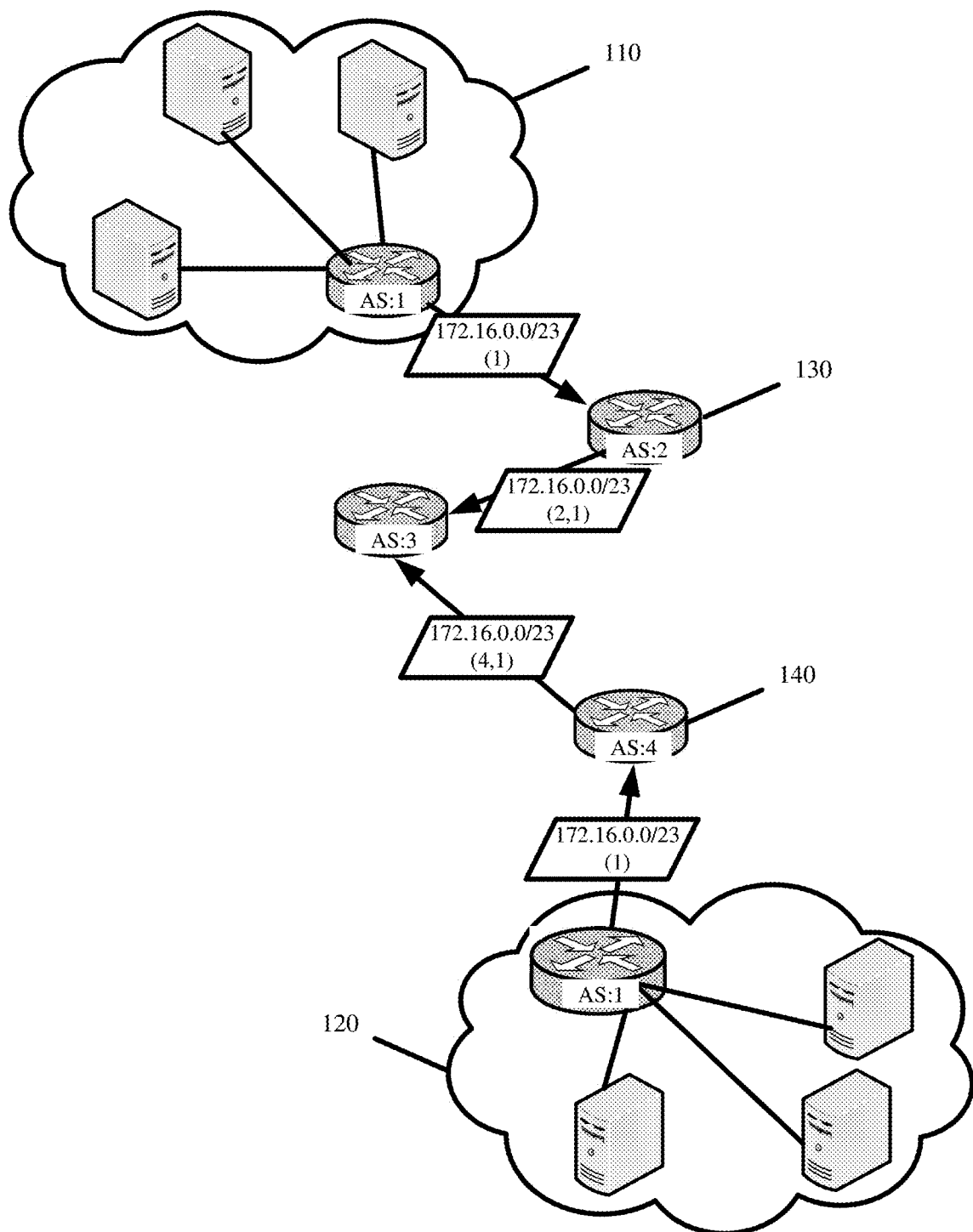
FIG. 1 conceptually illustrates an Anycast based network architecture.

The following detailed description refers to the accompanying drawings. The same reference numbers in different drawings may identify the same or similar elements.

Systems and/or methods, as described herein, may provide predictive Anycast traffic shaping. The predictive Anycast traffic shaping may include a primary Anycast network with different sites that advertise the same first set of Anycast network addresses to neighboring and/or connected network routers. Clients may use the first set of Anycast network addresses to access a site of the primary Anycast network. The predictive Anycast traffic shaping may also include a secondary shadow Anycast network that advertises a changing second set of Anycast network addresses from the same sites of the primary Anycast network, and that maps shifts in traffic, load, and/or clients from one site to one or more other sites resulting after each advertised change of the second set of Anycast network addresses. The primary Anycast network may then use the mappings to implement controlled and predetermined shifts of traffic, load, and/or clients across the sites by modifying one or more addresses advertised as part of the first set of Anycast network addresses to coincide with a particular second set of Anycast addresses that were advertised by the secondary shadow Anycast network and that produced the shifts of traffic, load, and/or clients being mirrored in the primary Anycast network.

The predictive Anycast shaping disclosed herein therefore provides a system for managing and performing a controlled redistribution of inbound requests to different sites of an Anycast network. The system operates by determining how different shifts in the inbound requests, created by the manipulation of Anycast addressing that is advertised from each site, affects the outbound load at each site. Consequently, the system disclosed by the embodiments presented herein avoids building and tracking large state-tables of the underlying network (e.g., Internet) in order to make decisions about how requests and/or load will be routed. The system presented herein can produce deterministic and controlled shifts of traffic between different Anycast sites without knowledge or mapping of the underlying network.

The first set of addresses advertised by the primary Anycast network may be in a first address space. The changing second set of addresses advertised by the secondary shadow Anycast network may be in a different second address space so as to not impact the primary Anycast network and/or clients accessing content, services, and/or data from the different sites of the primary Anycast network. For instance, the first set of addresses may include one or more IP addresses in a first subnet, address block, prefix, and/or range of IP addresses, and the second set of addressing may include one or more IP addresses in a different and non-overlapping second subnet, address block, prefix, and/or range of IP addresses.

In some embodiments, the secondary shadow Anycast network may produce the network address mappings from the second address space to the first address space by initially mirroring an operating state of the primary Anycast network from the secondary shadow Anycast network. To do so, the secondary shadow Anycast network may advertise an initial second set of addresses that correspond to the first set of addresses being advertised in the primary Anycast network. For instance, each site in the primary Anycast network may advertise Internet Protocol ("IP") address 1.1.1.0/24, and may expose the 1.1.1.0/24 address to clients attempting to access content, services, and/or data from the primary Anycast network. The secondary shadow Anycast network may advertise IP address 2.2.2.0/24 from each site without exposing IP address 2.2.2.0/24 for content, service, and/or data access.

The secondary shadow Anycast network may perform a catchment measurement at each site using traffic that is unrelated and non-impacting to the traffic of the primary Anycast network. The catchment measurements at the different sites may be compiled in order to track the traffic, load, and/or clients at each site after advertising the initial second set of addresses that are used to mirror the operating state of the primary Anycast network. From the catchment measurements, the secondary shadow Anycast network may obtain a representative baseline of the traffic, load, and/or clients that each site in the primary Anycast network experiences and/or receives.

The secondary shadow Anycast network may then modify one or more of the initial second set of addresses, may advertise the second set of addresses with the one or more modifications, may perform a catchment measurement at each site, may compile the catchment measurements, and/or may compare the catchment measurements from the modified second set of addresses to the catchment measurements from the initial second set of addresses in order to determine shifts in traffic, load, and/or clients that result from the changed addressing. The secondary shadow Anycast network may also track performance characteristics associated with each shift. For instance, the secondary shadow Anycast network may detect additional latency that a subset of clients may experience as a result of being shifted from a first site to a second site.

The secondary shadow Anycast network may revert back to the operating state by advertising the initial second set of addresses, advertise other changes to the second set of addresses, and/or track resulting shifts until multiple shifts between different sites and different amounts of shifted traffic, load, and/or clients are determined. The traffic shifts and performance characteristics may be mapped to the particular modified second set of addresses that were advertised after the initial second set of addresses (e.g., one or more changes that were made to the initial second set of addresses), and that produced those traffic shifts and performance characteristics. The mappings may be stored in table that tracks specific shifts of traffic, load, and/or clients across the sites that result from each of the different advertised second sets of addresses.

An event may cause the primary Anycast network to deviate from its operating state. For instance, the primary Anycast network may experience a failure that results in an unexpected traffic shift to one or more sites, may receive excess demand at one or more sites, and/or may take resources in a site offline for maintenance, upgrades, and/or other reasons. The primary Anycast network may reference the table generated by the secondary shadow Anycast network and the corresponding mappings therein to identify predetermined shifts of traffic, load, and/or clients that can restore the primary Anycast network to the steady or other desired state. For instance, the primary Anycast network may determine an amount of traffic to shift away from one or more sites that are impacted by the event, and one or more destination sites with available capacity to receive the traffic. The primary Anycast network may then reference the table to identify mappings that provide predetermined traffic shifts equal to or greater than the needed shift from the one or more impacted sites to the one or more destination sites. Moreover, each mapping may be associated with performance characteristics. The primary Anycast network may then select the mapping that impacts the shifted clients the least and that still restores the primary Anycast network to a desired operating state. The primary Anycast network implements the selected mapping by converting the particular second set of addresses from the selected mapping to corresponding addressing in the first address space of the primary Anycast network, and may advertise a new and modified first set of Anycast addresses, that incorporates the converted addressing from the particular second set of addresses, from one or more sites of the primary Anycast network to implement the predetermined shifts.

In some embodiments, a site of the primary Anycast network represents a physical location, device, and/or set of collocated devices that advertises the same network addressing as another site of the primary Anycast network. A site may advertise network addressing to neighboring network devices (e.g., routers) outside and/or connected to the site. The network devices may include network devices of network peers, transit providers, Internet exchanges, and/or of a different Autonomous System ("AS").

In some embodiments, the sites represent different points-of-presence ("PoPs") of the primary Anycast network. The PoPs may include devices and/or resources that are geographically separated from one another, but that can be accessed for the same content, services, and/or data using the same set of network addresses advertised from each site.

The sites may include at least one gateway device for advertising the network addresses for the primary Anycast network and/or the secondary shadow Anycast network to neighboring and/or directly connected network devices. The address advertisements may be issued as Border Gateway Protocol ("BGP") or other exterior routing protocol updates, announcements, and/or other messages. Changing the advertised addressing may include distributing a first Anycast advertisement with a first set of addresses from gateway devices of one or more sites during a first time, and distributing a second Anycast advertisement with a second set of addresses that add one or more specific routes that are within broader advertised cover routes (e.g., network addresses with a larger prefix than previously advertised network addresses), that withdraw one or more addresses from the first set of addresses, that prepend modified network path lengths (e.g., AS identifiers) to one or more of the first set addresses, that advertise different BGP communities, and/or otherwise differ from the first set of addresses.

Figure 2:
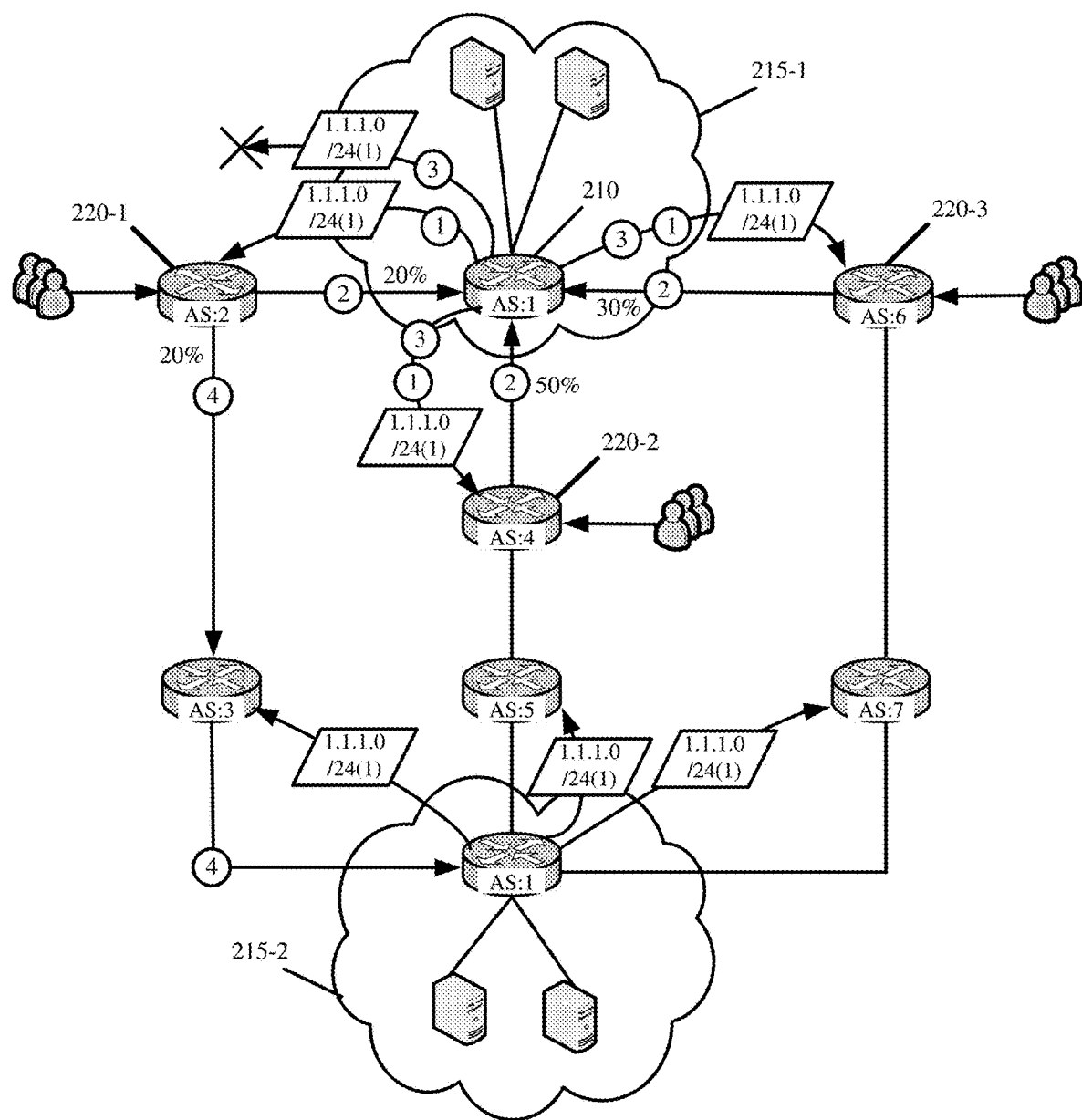
FIG. 2 illustrates an example of modifying advertised Anycast network addresses in order to shift traffic from one site to another site in accordance with some embodiments described herein.

FIG. 2 illustrates an example of modifying advertised Anycast network addresses in order to shift traffic from one site to another site in accordance with some embodiments described herein. FIG. 2 illustrates a gateway device 210 operating from site 215-1 of a primary Anycast network with at least one other site 215-2 (herein sometimes collectively referred to as "sites 215" or individually as "site 215"). Gateway device 210 may be a router that advertises reachability information to neighboring routers 220-1, 220-2, and 220-2 (herein sometimes collectively referred to as "routers 220" or individually as "router 220") of different transit providers, peers, Internet exchanges, and/or other network contributors. The primary Anycast network may include additional sites, such as second site 215-2, with gateway devices that also advertise the same reachability information (e.g., Anycast network addresses) to their respective neighboring routers.

As shown in FIG. 2, gateway device 210 initially advertises (at 1) a first set of addresses to routers 220. The first set of addresses may include addresses that gateway devices from one or more other Anycast network sites of the same primary Anycast network also advertise to their neighboring routers. Gateway device 210 may receive and/or monitor (at 2) traffic, load, and/or clients accessing site 215-1 from each router 220.

In response to an event, gateway device 210 may shift a particular amount of traffic away from site 215-1. In this figure, gateway device 210 produces (at 3) the traffic shift by withdrawing announcements of the first set of addresses to router 220-1 while continuing to announce (at 3) the first set of addresses to routers 220-2 and 220-3. Consequently, router 220-1 determines that site 215-1 is no longer reachable, and shifts (at 4) all traffic intended for site 215-1 to the next closest site of the Anycast network also advertising the first set of addresses (e.g., site 215-2).

Gateway device 210 may produce the same and/or other traffic shifts via announcements that prepend to the AS path, advertise different addressing, and/or change the original announcement issued from gateway device 210 in some manner. For instance, rather than withdrawing the advertisement of the first set of addresses to router 220-1, gateway device 210 may continue to advertise the first set of addresses with a longer prepended AS path (e.g., "1.1.1.0/24 (10, 9, 1)"). Such an advertisement would cause router 220-1 to determine that the network path or route to site 215-1 has more network hops and/or is longer than the network path or route to neighboring site 215-2 of the primary Anycast network advertising the same first set of addresses. Accordingly, router 220-1 would route traffic client traffic from site 215-1 and shift the traffic to site 215-2.

The event that triggers the shift in FIG. 2 may correspond to a failure in site 215-1 or a network path leading to site 215-1 via router 220-1. The event may also occur as a result of site 215-1 being overloaded, and a need to shift the particular amount of traffic from site 215-1 to another site. For instance, one or more servers of site 215-1 may need to be taken offline, and the particular amount of traffic corresponds to the load that is handled by the one or more servers prior to being taken offline for maintenance, repair, upgrade, and/or other reasons.

In some embodiments, the predictive Anycast traffic shaping can be enhanced via Domain Name System ("DNS") resolution. In particular, DNS operation can be modified or made to work in conjunction with the Anycast routes that are advertised from one or more sites in order to provide more granular control over the specific traffic, load, and/or clients that are moved from one site to another.

Figure 3A:
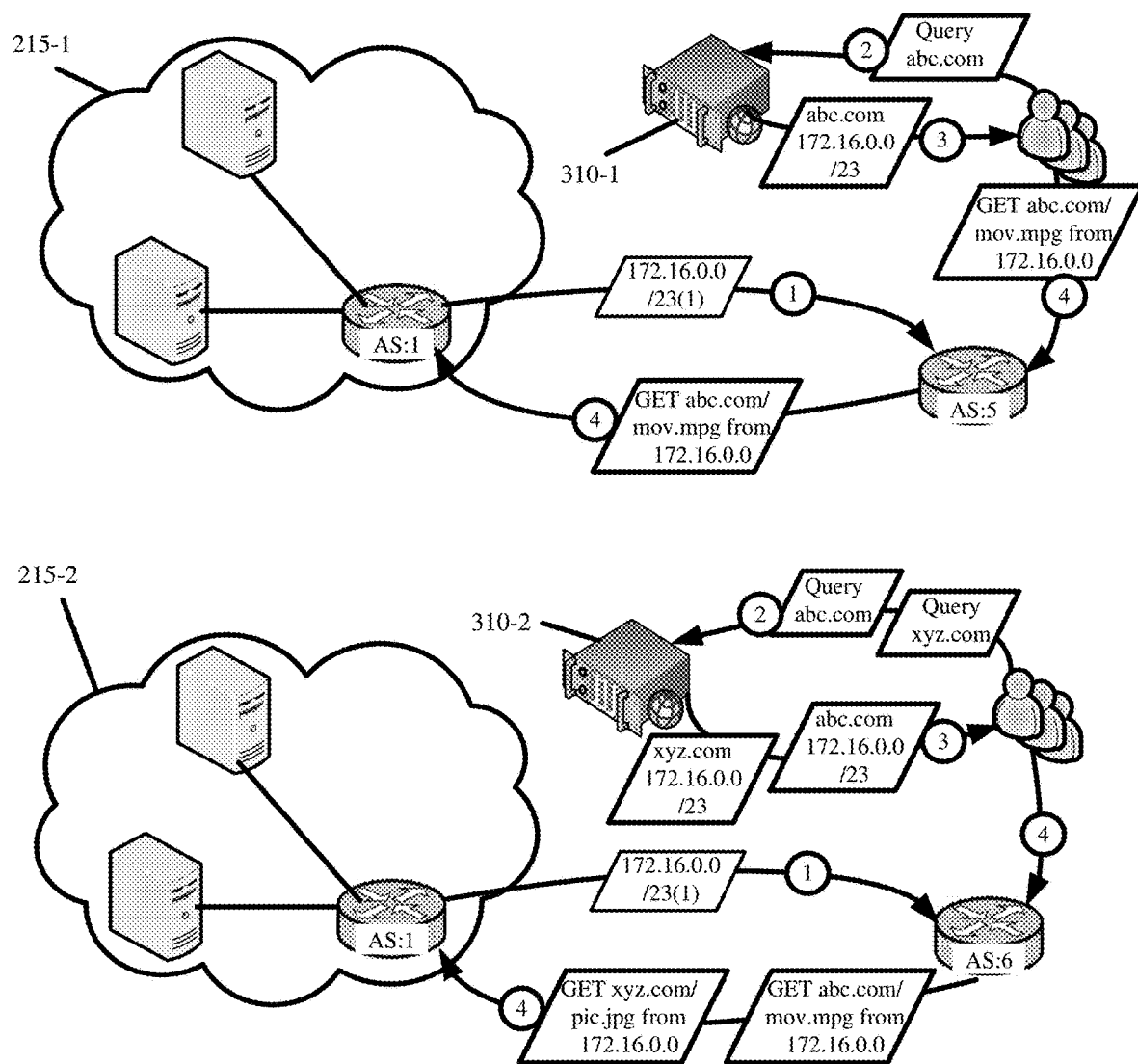
FIGS. 3A and 3B illustrate an example of using modified DNS operation to provide granular traffic shifting control in accordance with some embodiments described herein.
Figure 3B:
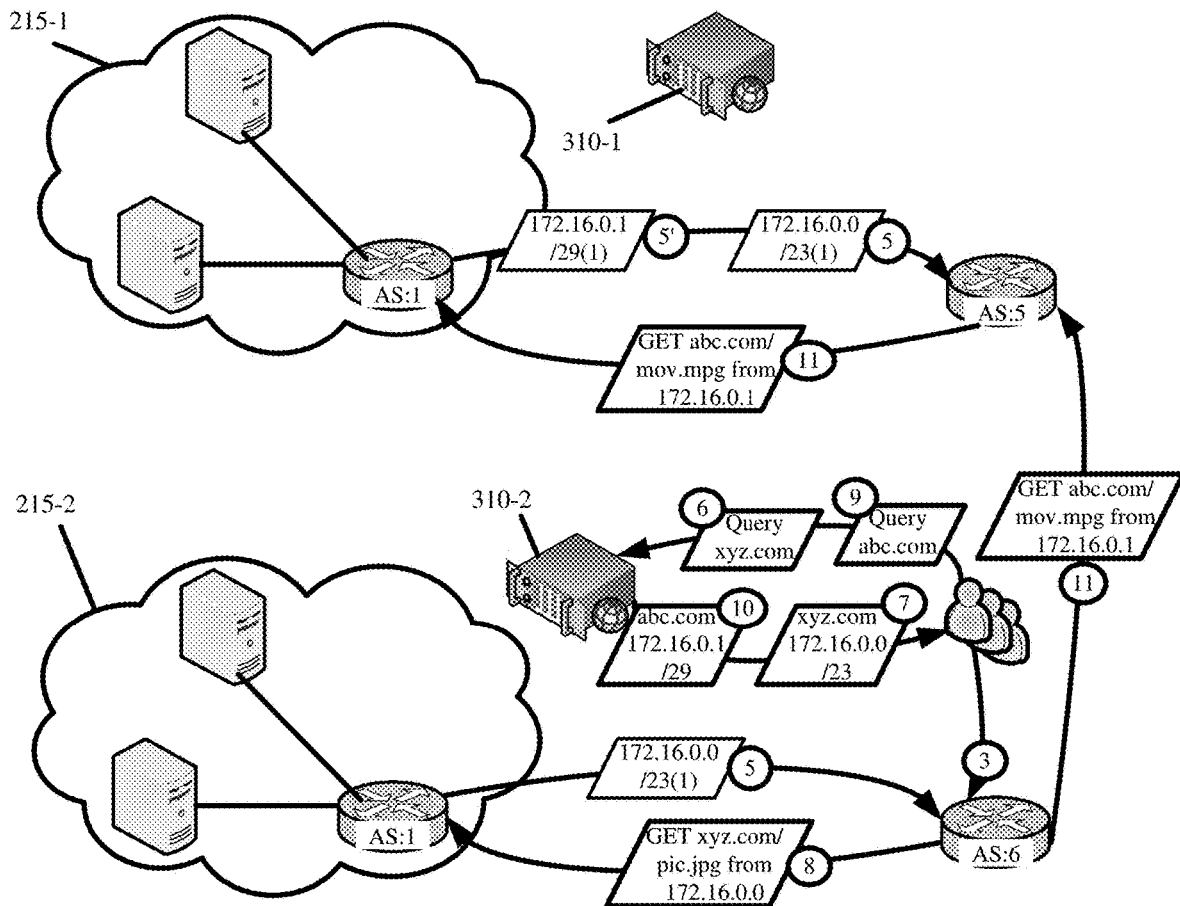

FIGS. 3A and 3B illustrate an example of using modified DNS operation to provide granular traffic shifting control in accordance with some embodiments described herein. FIGS. 3A and 3B illustrate two sites 215-1 and 215-2 of a primary Anycast network that advertise the same first set of addresses, and DNS servers 310-1 and 310-2 (herein sometimes collectively referred to as "DNS servers 310" or individually as "DNS server 310") that resolve client queries for content, services, and/or data distributed from sites 215 to a network address from the first set of network addresses.

As shown in FIG. 3A, gateway devices from sites 215 advertise (at 1) the same Anycast network address or address block to neighboring routers. Clients may submit (at 2) DNS queries for different domains to DNS servers 310. DNS servers 310 may resolve (at 3) the requests to the same Anycast address, and subsequent client requests directed to the Anycast address are routed (at 4), via BGP operation, to a closest site (e.g., site 215-1 or site 215-2) of the primary Anycast network. The closest site may be the site with the fewest hops to the requesting client. Some upstream routers may modify the BGP operation with parameters that prioritize other factors. For instance, some upstream routers may select a site of the Anycast network based on costs associated with different paths to different sites.

In FIG. 3B, gateway devices in sites 215 may continue to advertise (at 5) the same first Anycast address. However, the gateway device from site 215-1 may also advertise (at 5') a second Anycast address that is in the same Anycast block of addresses as the first Anycast address. In particular, the first Anycast address may be a cover route with a smaller address prefix, and the second Anycast address may be specific route within the cover route with a larger address prefix.

When clients submit (at 6) a first set of DNS queries for a first set of domains to DNS server 310-2, DNS server 310-2 may resolve (at 7) the first set of queries to the first Anycast address. Subsequent requests directed to the first address may route (at 8), via BGP operation, to closest site 215-2. When clients submit (at 9) a second set of DNS queries for a second set of domains to DNS server 310-2, DNS server 310-2 may resolve (at 10) the second set of queries to the second Anycast address instead of the first Anycast address. Since the second Anycast address is advertised from site 215-1 and not site 215-2, and since the address prefix of the second Anycast address has a larger prefix, routers may use the more specific routing table entry that was created based on the second advertisement to route (at 11) the second set of requests to site 215-1.

In FIG. 3B, DNS server operation is modified to resolve different domain names to different advertised Anycast addressing in order to shift traffic associated with some domain names to a different site than traffic associated with other domain names. In some embodiments, DNS server operation may be modified to resolve queries from different sets of client addresses to different Anycast addresses. In this manner, the specific clients can be shifted from one Anycast network site to another.

FIGS. 2, 3A, and 3B provide some examples of network address advertisement changes that the primary Anycast network may use to implement shifts of traffic, load, and/or clients from one site to one or more other sites. The predictive Anycast traffic shaping provides the secondary shadow Anycast network to predetermine the shifts that occur with each network address advertisement change that may be made at one or more sites of the primary Anycast network.

In some embodiments, the secondary shadow Anycast network may advertise different second sets of addresses in the second address space that shadows but does not affect the primary Anycast network routing in order to predetermine the one or more source sites from which traffic will be shifted away, the one or more destination sites that the shifted traffic will be diverted to, the amount of traffic, amount of load, and/or subset of clients that is shifted, and/or the performance impact of each shift that occurs from advertising each of the second sets of network addresses. When a particular shift is desired in the primary Anycast network, a similar shift in the secondary shadow Anycast network that resulted from a particular second set of addresses can be identified, and the particular second set of addresses can be mapped to the first address space and used to change the first set of addressing that determines the routing of traffic, load, and/or clients to the primary Anycast network.

Figure 4:
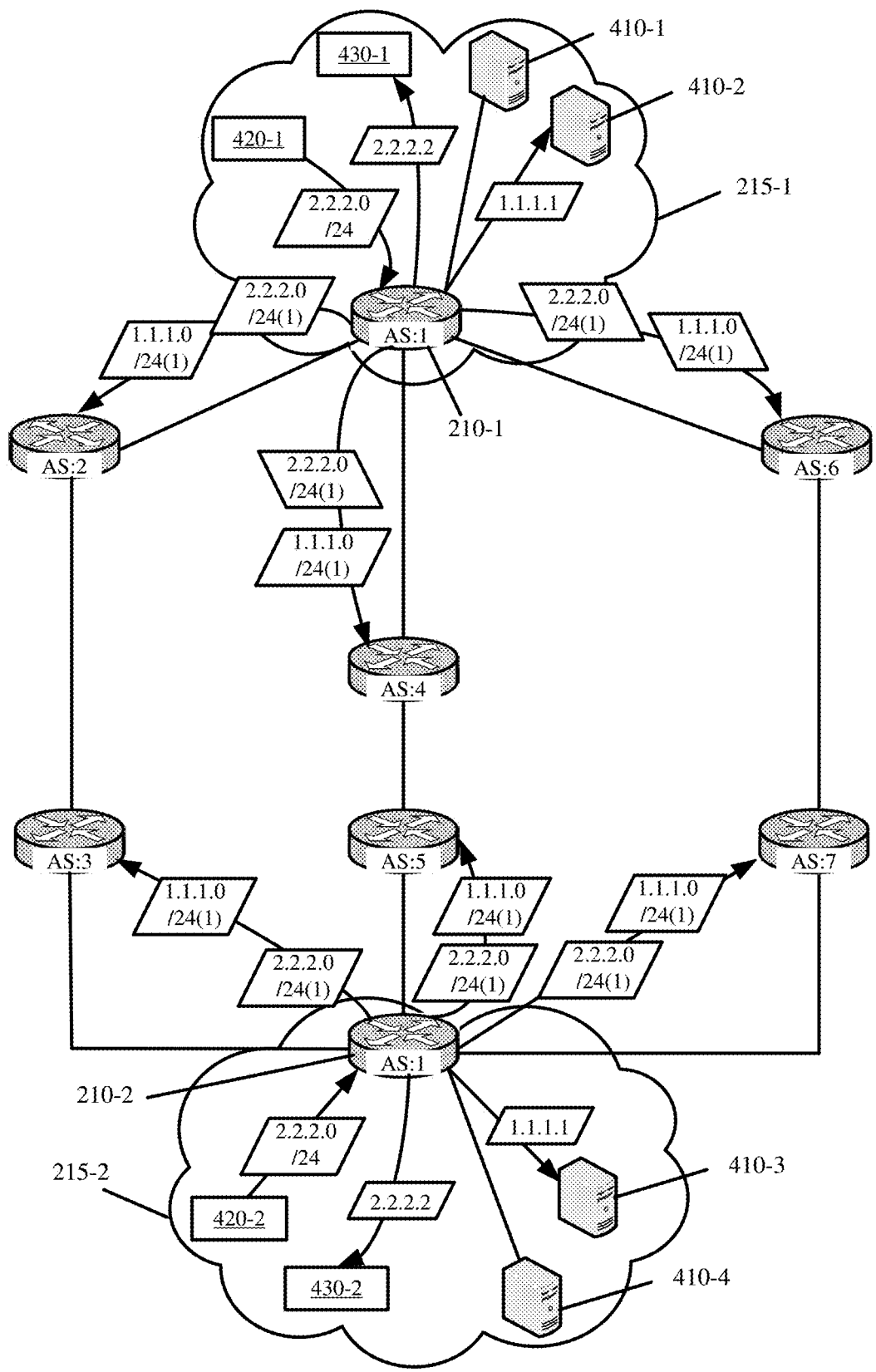
FIG. 4 conceptually illustrates a secondary shadow Anycast network for providing predictive Anycast traffic shaping for a primary Anycast network in accordance with some embodiments described herein.

FIG. 4 conceptually illustrates a secondary shadow Anycast network for providing predictive Anycast traffic shaping for a primary Anycast network in accordance with some embodiments described herein. The primary Anycast network may include sites 215-1, 215-2, and/or other sites not shown in FIG. 4 that operate from different network and/or geographic locations. Each site 215 of the primary Anycast network includes at least one gateway device 210 (e.g., gateway device 210-1 in site 215-1, and gateway device 210-2 in site 215-2), and one or more servers (e.g., servers 410-1 and 410-2 in site 215-1, and servers 410-3 and 410-4 in site 215-2, herein sometimes collectively referred to as "servers 410" or individually as "server 410").

As noted above, gateway device 210 may be used to advertise reachability information for a corresponding site 215 to neighboring routers and/or network devices. Servers 410 host and/or distribute content, services, and/or data to clients that request those content, services, and/or data from the primary Anycast network using one or more network addresses in the first address space of the primary Anycast network that are advertised by gateway devices 210.

The secondary shadow Anycast network operates from sites 215 of the primary Anycast network. At each site 215, the secondary shadow Anycast network may include route injector 420 (e.g., route injector 420-1 in site 215-1, and route injector 420-2 in site 215-2), and catchment device 430 (e.g., catchment device 430-1 in site 215-1, and catchment device 430-2 in site 215-2). In some embodiments, catchment device 430 and route injector 420 may operate from separate physical machines. In some other embodiments, catchment device 430 and route injector 420 may be modules or components that execute from the same physical machine in each site 215.

Each route injector 420, that operates within a particular site 215, may operate in conjunction with or independently of gateway device 210 at that particular site 215. In some embodiments, route injector 420 may be a shadow gateway device that advertises the changing second sets of Anycast addresses from a particular site 215 alongside gateway device 210 that advertises the first set of Anycast addresses from the particular site 215. In some embodiments, and as shown in FIG. 4, route injector 420 may be a component and/or device that leverages gateway device 210 at a particular site 215 to also advertise the changing second sets of Anycast addresses for the secondary shadow Anycast network with the first set of Anycast addresses for the primary Anycast network.

In some embodiments, route injectors 420 of the secondary shadow Anycast may be synchronized with one another. The synchronized operation allows route injectors 420 to generate and advertise different second sets of Anycast addressing at synchronized different times. For instance, route injectors 420 may initially advertise a common set of Anycast addresses in the second address space that correspond to the first set of addresses in the first address space being advertised for the primary Anycast network. In doing so, the secondary shadow Anycast network may mirror the routing and traffic distribution (e.g., operating state) that occurs in the primary Anycast network, albeit in the second address space that does not involve actual client traffic that is routed via addressing in the first address space. Then, one or more route injectors 420 may change and advertise one or more different addresses during a second time while other route injectors 420 continue to advertise the same set of Anycast addresses in order to monitor shifts that result from the changes.

Route injectors 420 may synchronize operation to allow each site 215 and different site combinations to iterate through multiple addressing changes in order to generate shifts of different amounts of traffic, load, and/or subsets of clients from one or more different source sites 215 to one or more different destination sites 215. In some embodiments, route injectors 420 may synchronize operation to restore the secondary shadow Anycast network to a common operating state after each address advertisement change and before a new advertisement change, so that the monitored shifts are determined from a common baseline (e.g., the operating state).

Catchment devices 430 of the secondary shadow Anycast network may detect and/or track the shifts of traffic, load, and/or clients that result from each address advertisement change created by route injectors 420. Catchment devices 430 may also synchronize their operation with route injectors 420 and/or with one another. For instance, after each address advertisement change by route injectors 420, catchment devices 430 may generate traffic (e.g., inbound requests) from various network locations. The generated traffic may be directed to the most recently advertised second set of advertised addresses of the secondary shadow Anycast traffic. Catchment devices 430 may track which sites 215 within the Anycast network receive the generated traffic, and may compile results from different catchment devices 430 in order to detect different quantities of traffic, load, and/or client that shift from different source sites 215 to different destination sites 215 as a result of each address advertisement change.

Figure 5A:
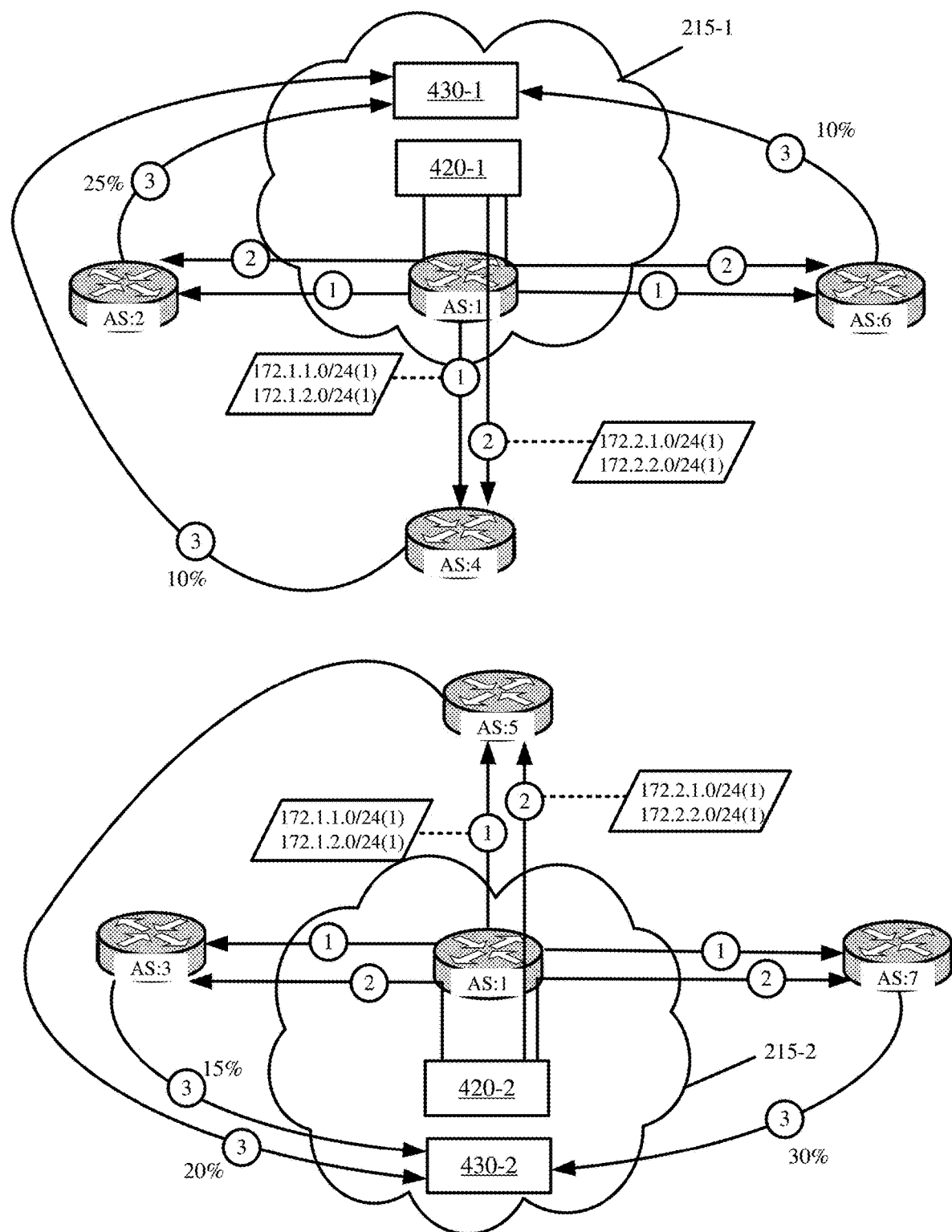
FIGS. 5A, 5B, 5C, and 5D illustrate example operation of the secondary shadow Anycast network in accordance with some embodiments described herein.

FIGS. 5A, 5B, 5C, and 5D illustrate example operation of the secondary shadow Anycast network in accordance with some embodiments described herein. As shown in FIG. 5A, each gateway device 210 advertises (at 1) the same first set of Anycast addresses in a first address space, and each route injector 420, via gateway device 210 in a corresponding site 215, may advertise (at 2) a second set of Anycast addresses in a second address space. The first set of Anycast addresses may be used by clients to request and access content, services, and/or data from one or more servers in sites 215. The second set of Anycast addresses is not exposed to clients, and does not impact performance and/or routing of the primary Anycast network. However, the second set of Anycast addresses is used to mirror the routing and traffic distribution (e.g., operating state) of the primary Anycast network in the second address space.

After advertising (at 2) the second set of Anycast addresses, catchment devices 430 may use test traffic to determine (at 3) a first representation of traffic, load, and/or a subset of client network addresses that route to each site 215. The test traffic is directed to the second set of Anycast address, and therefore does not affect traffic distribution and/or routing of the primary Anycast network. The test traffic may be generated from various points throughout the network to model and/or represent actual traffic in the primary Anycast network. In some embodiments, the test traffic may include inbound requests submitted from test nodes with different network addresses that can be mapped to and/or represent sets of client addresses that submit requests in the primary Anycast network. The first representation, and the second set of advertised addresses that produced the first representation, may be recorded by the secondary shadow Anycast network and used as a baseline for determining shifts that occur when changing the second set of Anycast addresses that are advertised from sites 215-1 and 215-2.

Figure 5B:
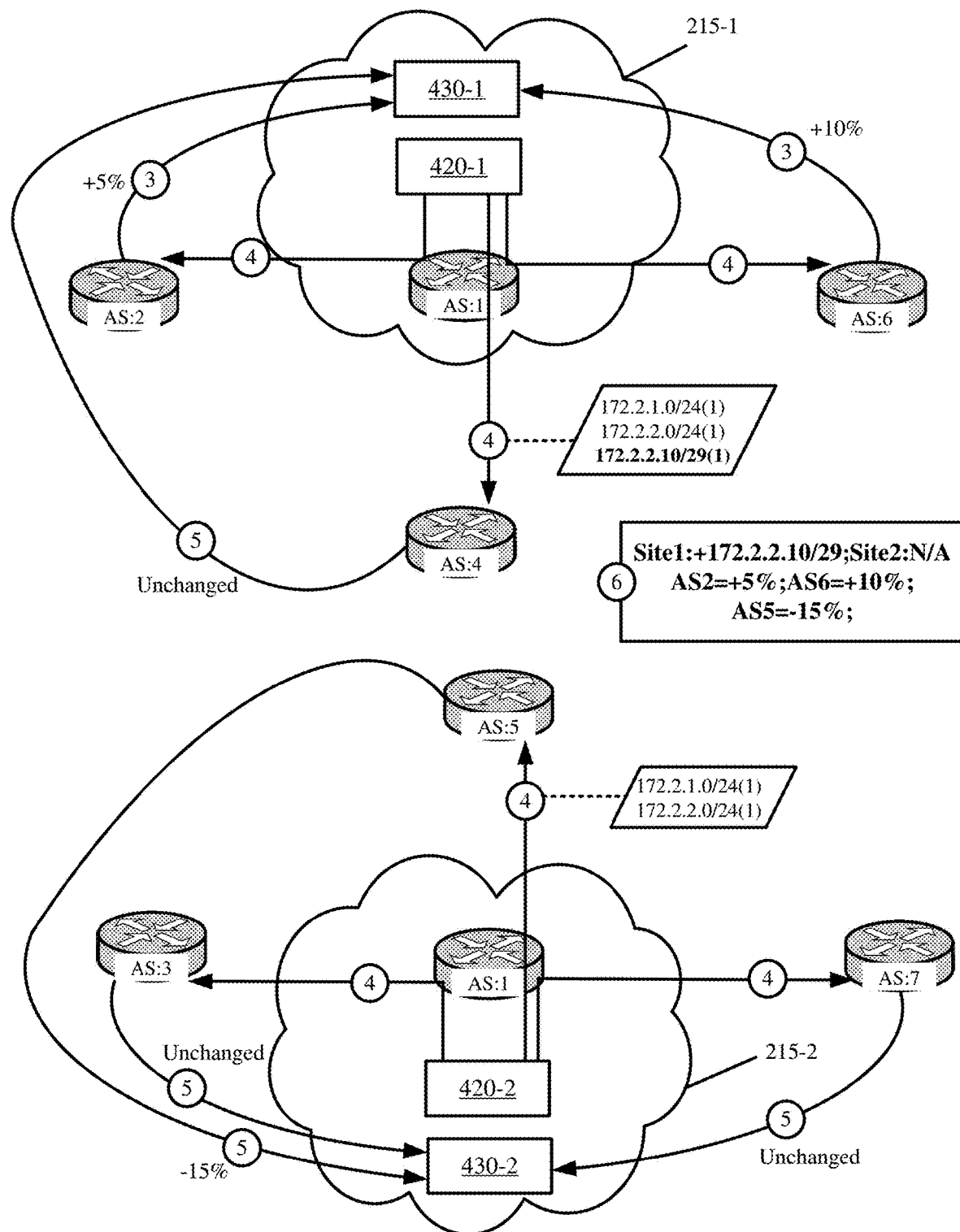

FIG. 5B illustrates route injector 420-1 in site 215-1 generating and/or advertising (at 4) the second set of Anycast addresses with a first change, and route injector 420-2 in site 215-2 generating and/or advertising (at 4) the second set of Anycast addresses with no change. Operation of route injectors 420 may be synchronized to monitor effects of an addressing change made at each site at different times. Route injectors 420 may also modify records of DNS servers to produce and/or remove entries for addressing that is introduced and/or removed as a result of the first change.

Catchment devices 430 may use the same test traffic to determine a second representation of traffic, load, and/or a subset of client network addresses at each site 215, and more specifically, to determine (at 5) a shift of traffic, load, and/or subset of client network addresses from the first representation to the second representation that resulted because of the first change to the second set of Anycast addressing made by route injector 420-1. The second set of Anycast address with the first change may be mapped and stored (at 6) with the resulting traffic distribution and/or traffic distribution changes.

As shown in FIG. 5B, a new entry is created (at 6) in a shift tracking table of the secondary shadow Anycast network that identifies advertisement of new specific route "172.2.2.10/29" from site 215-1 with no change in the addresses advertised from site 215-2, and that identifies site 215-1 receiving a 5% load increase from AS2 and a 10% load increase from AS6 with site 215-2 receiving a 15% load decrease from AS5 as a result of the first change made to the second set of addresses at site 215-1. In some embodiments, the load shifts may be determined by identifying client IP addresses (e.g., test node network address that map to and/or represent different sets of client IP addresses) that are shifted from a particular site to one or more other sites, and by mapping the amount of load that is generated by the shifted client addresses based on load those same clients produce at the particular site in the primary Anycast network.

In FIG. 5B, the first change involves advertising a new specific route within the cover route of the second set of Anycast addresses. Other changes may include advertising other specific routes within the cover route, prepending AS paths to the advertised one or more addresses, and/or withdrawing addresses that are advertised from one or more sites.

Figure 5C:
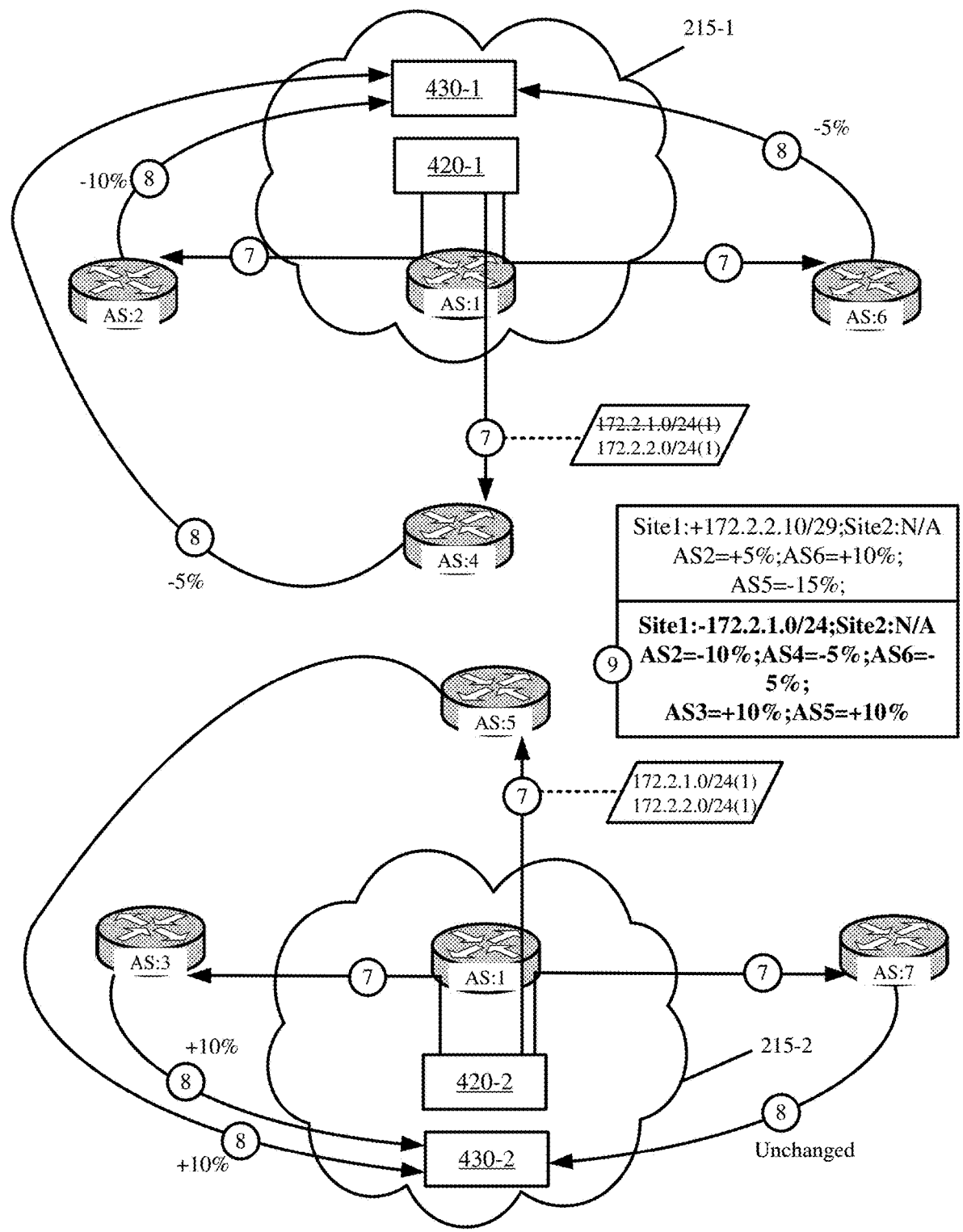

FIG. 5C illustrates route injector 420-1 generating and/or advertising (at 7) the second set of Anycast addresses with a different second change, and route injector 420-2 generating and/or advertising (at 7) the second set of Anycast addresses with no change. In some embodiments, route injectors 420 may restore the operating state of the primary Anycast network in the secondary shadow network by advertising the second set of Anycast addresses with no change before advertising each new change so that the shift resulting from each change is recorded from a common baseline which corresponds to the operating state of the primary Anycast network.

Catchment devices 430 may again use the same test traffic (e.g., inbound requests generated from the same requesting addresses) to determine a third representation of traffic, load, and/or a subset of client network addresses at each site 215, and more specifically, to determine (at 8) a shift of traffic, load, and/or subset of client network addresses from the first representation to the third representation that resulted because of the second change to the second set of Anycast addressing made by route injector 420-1. The second set of Anycast addresses with the second change may be mapped and stored (at 9) with the resulting traffic distribution and/or traffic distribution changes. In FIG. 5C, the second change involves withdrawing one of the second set of addresses from the advertisement and/or route announcement issued from site 215-1.

Figure 5D:
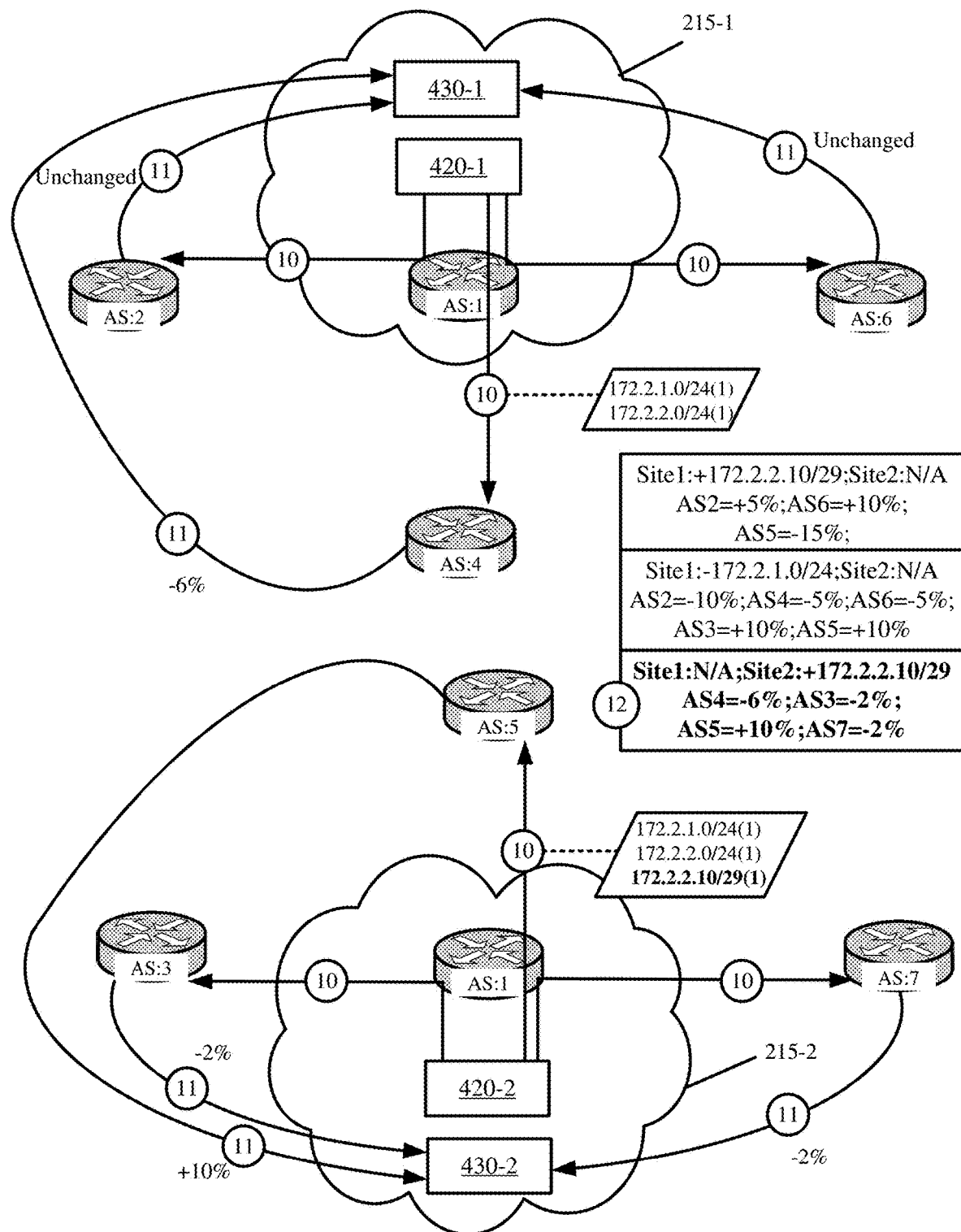

FIG. 5D illustrates route injector 420-2 generating and/or advertising (at 10) the second set of Anycast addresses with the first change, and route injector 420-1 generating and/or advertising (at 10) the second set of Anycast addresses with no change. Once again, route injectors 420 may restore the operating state of the primary Anycast network in the secondary shadow network by advertising the second set of Anycast addresses with no change prior to route injector 420-2 advertising (at 10) the addresses with the first change.

Catchment devices 430 may use the same test traffic to determine a fourth representation of traffic, load, and/or a subset of client network addresses at each site 215, and more specifically, to determine (at 11) a shift of traffic, load, and/or subset of client network addresses from the first representation to the fourth representation that resulted because of the first change to the second set of Anycast addresses made by route injector 420-2. The second set of Anycast addresses with the second change may be mapped and stored (at 12) with the resulting traffic distribution and/or traffic distribution changes.

Route injectors 420 and catchment devices 430 may continue the synchronized changing of the advertised second set of addresses and result tracking until a set number of changes have been advertised from each site 215 and/or combination of sites 215, and/or a set number of traffic shifts from each site 215 to one or more other sites 215 have been recorded. For instance, the secondary shadow Anycast network may continue to advertise different second sets of Anycast addresses until the shift tracking table includes load shifts in 5%, 10%, and 15% increments from each site 215 to each other site 215 of the primary Anycast network. As noted above, the load shifts may be derived from determining client IP addresses that are shifted from a particular site to one or more other sites, and by further determining the load that is created by the shifted client IP addresses at the particular site in the primary Anycast network. In some embodiments, each entry of the shift tracking table may also record client IP addresses that are shifted from one site to another site, specific content requests (e.g., requests directed to specific domain names, Uniform Resource Locators ("URLs"), file types, etc.), user agents, and/or other shifts.

Figure 6:
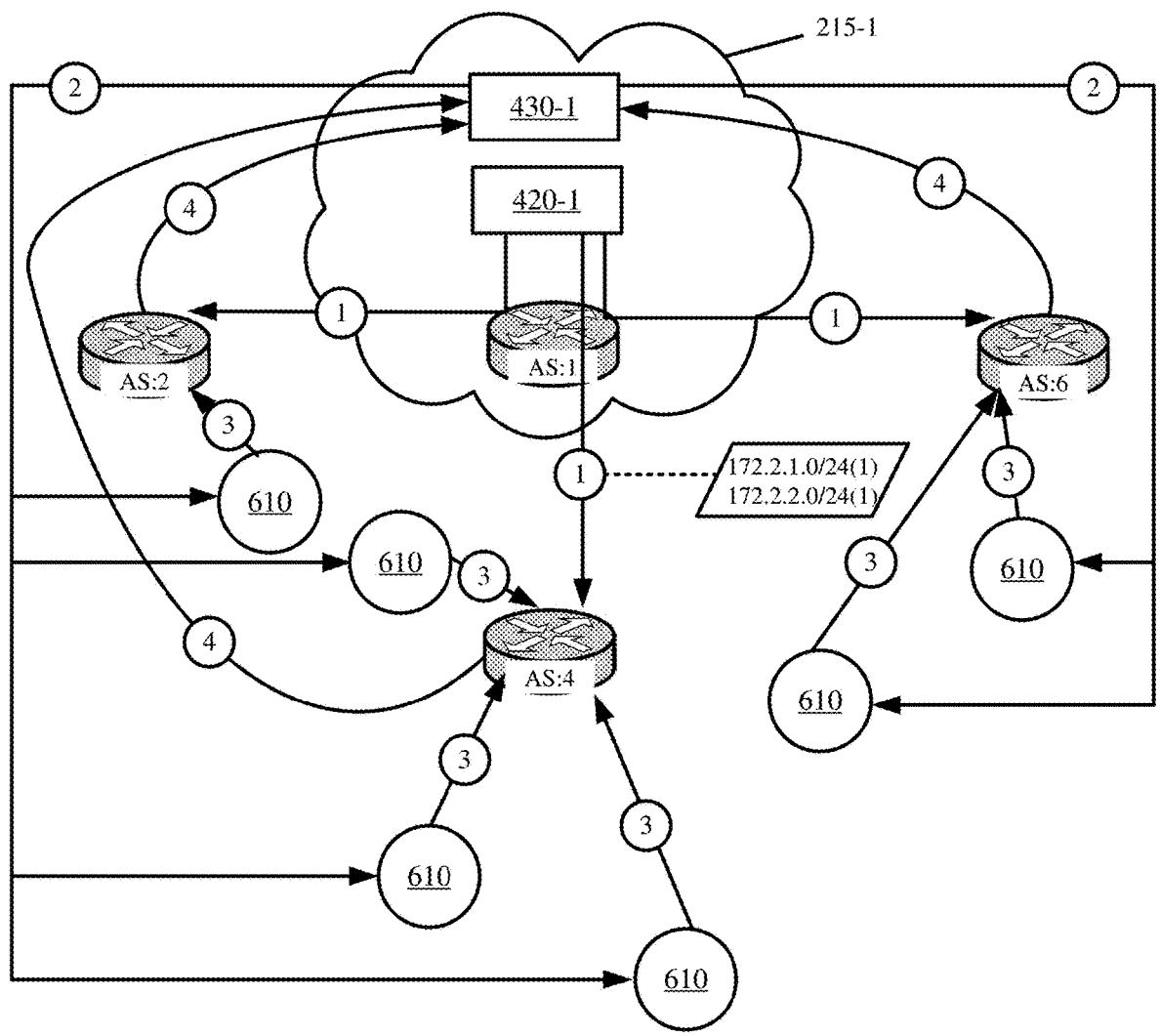
FIG. 6 illustrates an example of a catchment device generating and compiling test traffic using a distributed set of probes in accordance with some embodiments.

Catchment devices 430 may operate in different ways to generate and compile the test traffic that is used to determine how advertising different second sets of Anycast addresses impact the routing of traffic and/or clients to different Anycast sites 215. FIG. 6 illustrates an example of catchment device 430-1 generating and compiling test traffic using a distributed set of probes 610 in accordance with some embodiments.

In some embodiments, the secondary shadow Anycast network may deploy its own set of probes 610, and/or use probes 610 that others have deployed to different geographic locations. Probes 610 may represent network devices at different geographic locations that can generate network traffic in response to signals and/or network issued commands from one or more catchment devices 430. Each probe 610 may represent a different set of clients and/or address block that operates from the same geographic location or region as that probe 610.

After a second set of Anycast addresses with one or more changes have been advertised (at 1) from sites 215, and have had sufficient time to propagate across the network, catchment device 430-1 (and/or other catchment devices 430 operating from other sites 215) may trigger (at 2) the probes to generate traffic. Each probe 610 may then generate (at 3) one or more packets with a destination address set of one or more addresses in the second set of Anycast addresses that are advertised from sites 215 of the Anycast network.

Routers within the network may use BGP and/or another routing protocol to route (at 4) the packets generated by probes 610 to a site 215 of the Anycast network that advertised the Anycast addresses. Catchment device 430 at each site 215 may receive a subset of the packets that are generated by probes 610 and that route to that site 215.

Catchment device 430 at each site 215 may track the source IP address of each received packet, and may map the list of probe IP addresses to a corresponding set of advertised Anycast addresses. The probe IP addresses received in response to packets issued after advertising a baseline or unchanged second set of Anycast addresses may be compared against the probe IP addresses that are received in response to packets issued after advertising the second set of Anycast addresses with one or more changes. From the comparison, catchment device 430-1 at site 215-1 may determine which probe IP addresses were shifted away from site 215-1, and which probe IP addresses were shifted to site 215-1 as a result of the one or more changes to the advertised Anycast addresses. For instance, if an IP address of a first probe is no longer detected at site 215-1 after a particular change to the Anycast addressing of the secondary shadow Anycast network, then catchment device 430-1 may determine that the first probe was shifted to another site 215 in the secondary shadow Anycast network as a result of the change in Anycast addressing. Similarly, if an IP address of a second probe is newly detected after advertising a change in the Anycast addressing of the secondary shadow Anycast network, then catchment device 430-1 may determine that the second probe was shifted to site 215-1 as a result of the change in Anycast addressing.

In some embodiments, catchment devices 430 may synchronize their operation and compile their results together. From the compiled set of results obtained from catchment devices 430 in different sites 215, the secondary shadow network can determine exactly where each probe is shifted away from and shifted to during each advertising change. The shifts of traffic, load, and/or clients resulting from each set of advertised Anycast addresses and compiled from catchment devices 430 may be recorded to the shift tracking table of the secondary shadow Anycast network.

In some embodiments, catchment devices 430 may also capture performance parameters for each received packet. The performance parameters may include latency, roundtrip time, timestamps, and/or other values from which catchment device 430 may determine the amount of time it takes for each packet to route from a probe 610 to catchment device 430. From the performance parameters, the performance impact of each shift on the Anycast network resulting from an Anycast addressing change can be determined. For instance, a first catchment device 430 in a first site 215 may receive a packet from a particular probe with 30 milliseconds ("ms") of latency in response to the packet being addressed to a network address in an advertised second set of addresses. The secondary shadow Anycast network may then advertise the second set of addresses with a change. After the Anycast address change propagates across the network, a second catchment device 430 in a different second site 215 may receive a packet from the particular probe with 40 ms of latency. By compiling the probe IP addresses and performance parameters from catchment devices 430 and the first and second sites 215, the secondary shadow Anycast network can determine that the Anycast address change imposed a 10 ms delay on packets originating from the geographic region of the particular probe. The performance impact for each set of advertised Anycast addresses may also be recorded to the shift tracking table of the secondary shadow Anycast network.

In this manner, catchment devices 430 and/or the data compiled from catchment devices 430 may be used to determine a percentage of traffic that shifts from one site to another site of the Anycast network, and may further determine the difference in latency when that percentage of traffic was shifted from a first site to one or more second sites. Moreover, the catchment measurements may be directly correlated to actual traffic and/or clients requesting content from the primary Anycast network. For instance, a particular probe may represent a set of clients that operate from a particular geographic region. Accordingly, the address of the particular probe may correspond to the set of network addresses of the set of clients, and the traffic generated by the particular probe may be mapped to the traffic load created by the set of clients. Therefore, if the particular probe is shifted from a first site to a second site as a result of an advertising change made in the secondary shadow Anycast network, the system may determine that a corresponding change made in the primary Anycast network would result in the network addresses of the set of clients and the load that is generated by the set of clients to shift in a similar manner. In this manner, the system can map the catchment measurements to predetermined amounts of traffic and/or clients of the primary Anycast network.

Figure 7:
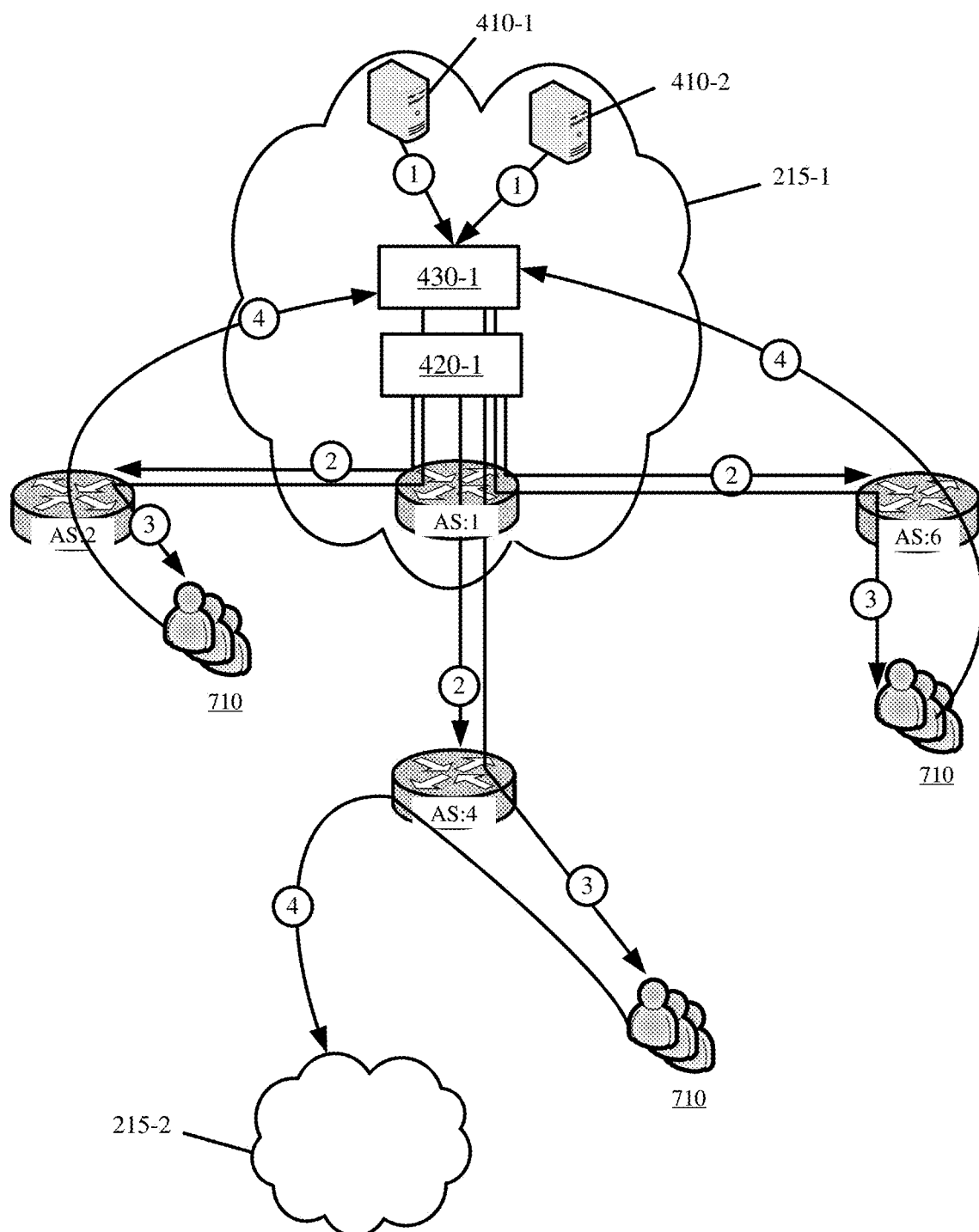
FIG. 7 illustrates an example of a catchment device generating and compiling test traffic from one or more clients in accordance with some embodiments.

Catchment devices 430 may also generate test traffic from a sampling of clients that request content, services, and/or data from the primary Anycast network. FIG. 7 illustrates an example of a catchment device generating and compiling test traffic from one or more clients in accordance with some embodiments.

FIG. 7 illustrates different clients 710 requesting content, services, and/or data from servers 410-1 and 410-2 in site 215-1 of the primary Anycast network from different geographic locations and/or ASes. Catchment device 430-1, operating in site 215-1, may obtain (at 1) IP addresses of clients 710. In some embodiments, catchment device 430-1 may obtain (at 1) the client IP addresses by inspecting traffic passing through gateway device of site 215-1 and/or by communicably coupling with servers 410-1 and 410-2. In some embodiments, catchment device 430 may obtain (at 1) the IP address of every Nth client request (e.g., every tenth request, every hundredth request, etc.) that is received at site 215, IP addresses of clients 710 that are routed over different ASes, and/or IP addresses of clients 710 that are in different subnets, address blocks, and/or are mapped to different geographic regions.

Route injector 420-1 in site 215-1 and/or route injectors 420 at other sites 215 of the secondary shadow Anycast network may advertise (at 2) a second set of addresses. The second set of addresses may differ from the first set of addresses used by clients 710 to access sites 215 of the primary Anycast network. In particular, route injectors 420 may advertise, from one or more sites 215, the second set of addresses with one or more changes that differ from an initial second set of addresses that replicate the operating state of the primary Anycast network in the second address space of the secondary shadow Anycast network.

After sufficient time for the advertised second set of addresses to propagate across the network, catchment device 430-1 (and/or other catchment devices 430 operating from other sites 215) may trigger (at 3) a sampled set of clients 710 to direct traffic to the advertised second set of addresses. In some embodiments, catchment device 430-1 may use Internet Control Message Protocol (ICMP) messages and/or messages of other protocols to ping or otherwise initiate traffic from clients 710 in different address blocks and/or different geographic regions. The messages issued (at 3) by catchment devices 430 to clients 710 may specify a source address that is one of the advertised second set of addresses.

In response, clients 710 may reply (at 4) with one or more packets directed to one or more addresses from the advertised second set of addresses. Catchment device 430-1 may receive (at 4) one or more reply packets from clients 710.

Catchment device 430-1 may detect a traffic, load, and/or client shift that results from the one or more changes made to the advertised second set of addresses based on the received replies from client 710. In particular, catchment device 430-1 may track IP addresses of clients 710 that sent a reply message after advertising the second set of addresses with no changes, track IP addresses of clients 710 that sent a reply message after advertising the second set of addresses with one or more changes, and compare the tracked list of IP addresses to detect clients 710 that were shifted away from site 215-1 and/or other clients 710 that were shifted to site 215-1 as a result of the changes. In some embodiments, catchment devices 430 at different sites 215 compile the reply messaging received at each site 215 in order to specifically determine a number of shifted clients 710, and where those clients 710 are shifted to and/or from.

Catchment devices 430 may also track performance parameters associated with receiving the reply packets from clients 710. For instance, a roundtrip time, latency, and/or other performance parameters may be determined for each received reply.

Catchment devices 430 may enter the detected traffic, load, and/or client shifts associated with each advertised change of the second set of addresses to the shift tracking table. Catchment devices 430 may also enter the performance parameters associated with each advertised change to the shift tracking table.

FIG. 8 conceptually illustrates traffic shifting table 810 that tracks different advertised address changes for the secondary shadow Anycast network, the traffic, load, and/or client shifts that resulted from each address change, and/or the performance characteristics associated with each shift in accordance with some embodiments described herein. As shown in FIG. 8, table 810 may include first set of columns 820 that identify the addressing changes that are advertised from different sites 215 of an Anycast network. Multiple addressing changes can be made from a single site 215 or multiple sites 215 at any given time. In this example, table 810 includes a column for each of three sites 215 of a particular Anycast network. An entry with a "+" may indicate a new address that is advertised from that site. An entry with a "−" may indicate a previously advertised address that is withdrawn and no longer advertised from the corresponding site. Table 810 may have additional columns when the secondary shadow Anycast network is implemented from additional sites 215 of an Anycast network.

Table 810 may include several additional entries to iterate through a large sampling of addressing changes, and/or to determine the effects of each change when announced from a different site 215. In some embodiments, table 810 may include entries that produce different incremental shifts in different sites 215.

Table 810 may include a second set of columns 830 that identify the results of each shift. The results may indicate the traffic, load, and/or clients that were shifted to a site 215 (e.g., entries beginning with "+"), and traffic, load, and/or clients that were shifted away from a site 215 (e.g., entries beginning with "−"). The shifts may be determined on an AS basis, IP address block and/or subnet basis, and/or individual client IP address basis. In some embodiments, shifted load amounts or percentages may be produced by determining one or more clients that are impacted by a shift, and by determining the amount of load or traffic that the impacted clients produce in the primary Anycast network.

Each entry in the second set of columns 830 may also include a performance parameter. The performance parameter identifies the performance impact of each shift. For instance, a client may initially be routed to a first site (e.g., site 215-1) when requesting and receiving content using a particular Anycast address. After an Anycast advertising change, that client may be routed to a second site (e.g., site 215-2), which may cause requests from the client to traverse additional and/or different network hops, and impose additional latency in providing content, services, and/or data to the client. The performance parameters capture the impact to each client or set of clients that is shifted from one site 215 to another.

Traffic shifting table 810 therefore includes entries that provide predetermined shifts of traffic, load, and/or clients that result from advertising and/or announcing different sets of Anycast addressing from different sites 215 of the Anycast network. In some embodiments, the second set of addressing associated with the entries in traffic shifting table 810 fall within a second address space used for the secondary shadow Anycast network. However, each second set of addresses may have an equivalent and/or corresponding first set of addresses in the first address space of the primary Anycast network that can be used to reproduce the predetermined shifts from the secondary shadow Anycast network in the primary Anycast network.

Some embodiments include a traffic shaping device to implement predetermined traffic, load, and/or clients shifts in the primary Anycast network based on the entries of traffic shifting table 810 created from testing in the secondary shadow Anycast network. The traffic shaping device may be a physical machine of the primary Anycast network that modifies traffic flow therein. In some embodiments, the traffic shaping device may be a device that monitors sites

215 of the primary Anycast network. In particular, traffic shaping device may monitor traffic that is routed to each site 215 and/or load at each site 215, and may implement a predetermined shift in response to detecting a triggering event. The triggering event may occur from a network failure, a device failure, fluctuations in demand, and/or other changes that cause the primary Anycast network to deviate from a steady state. The primary Anycast network may deviate from the steady state when the amount of traffic, load, and/or clients at one or more sites exceeds one or more thresholds and/or experiences a sudden change.

Figure 9:
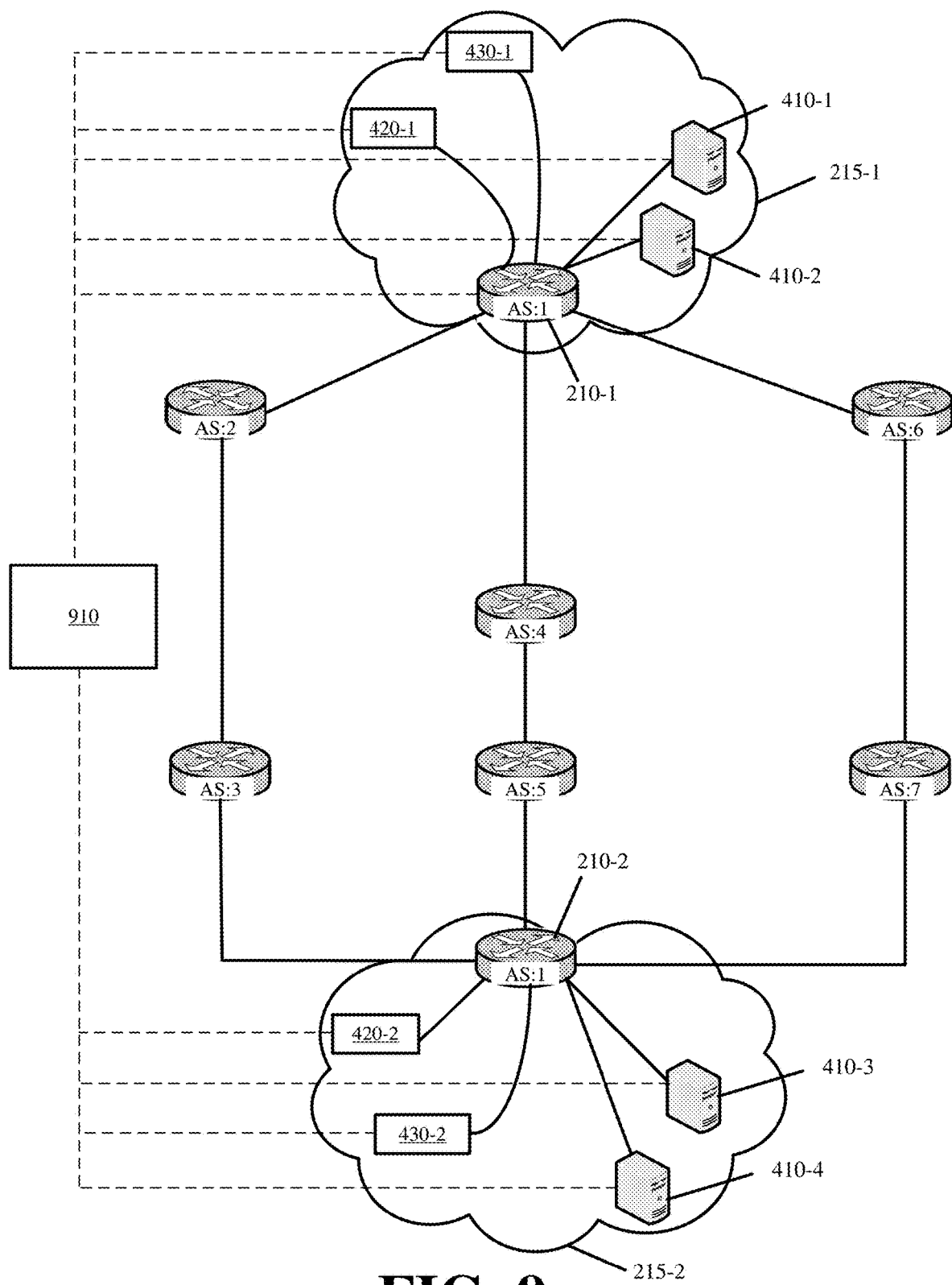
FIG. 9 conceptually illustrates a traffic shaping device operating as part of an Anycast network for predictive Anycast traffic shaping.

FIG. 9 conceptually illustrates traffic shaping device 910 operating as part of an Anycast network for predictive Anycast traffic shaping. Traffic shaping device 910 may be communicably coupled to the primary Anycast network and the secondary shadow Anycast network. In particular, traffic shaping device 910 may use the traffic shifts produced in the secondary shadow Anycast network to identify Anycast address advertisement changes that can be used to implement predetermined shifts of traffic, load, and/or clients in the primary Anycast network, and that can restore primary Anycast network to a steady state after a triggering event.

The Anycast network illustrated in FIG. 9 includes multiple sites 215 from which clients access content, services, and/or data using the same Anycast addresses that are in the first address space of the primary Anycast network. Traffic shaping device 910 may be communicably coupled to each site 215 of the Anycast network. More specifically, traffic shaping device 910 may be communicably coupled to gateway devices 210 and/or servers 410 at each site 215 in order to monitor the health, traffic, load, and/or clients accessing each site 215, and/or modify the first set of Anycast addresses that are advertised from gateway devices 210, and that are used in routing clients to different sites 215 of the primary Anycast network.

In some embodiments, traffic shaping device 910 may also be communicably coupled to each catchment device 430 in order to compile the measurements from each catchment device 430 at each site 215, and thereby create entries for traffic shifting table 810. In some other embodiments, catchment devices 430 create the traffic shifting table 810, and traffic shaping device 910 references traffic shifting table 810 when a predetermined traffic shift is needed. Specifically, traffic shaping device 910 may reference traffic shifting table 810 in order to change Anycast addressing that is advertised and/or announced in the primary Anycast network, and implement specific shifts of traffic, load, and/or clients between different sites in the primary Anycast network in response to different triggering events. Traffic shaping device 910 may also be communicably coupled to route injectors 420 in order to generate multiple predetermined shifts from which a corresponding shift in the primary Anycast network is based.

Figure 10:
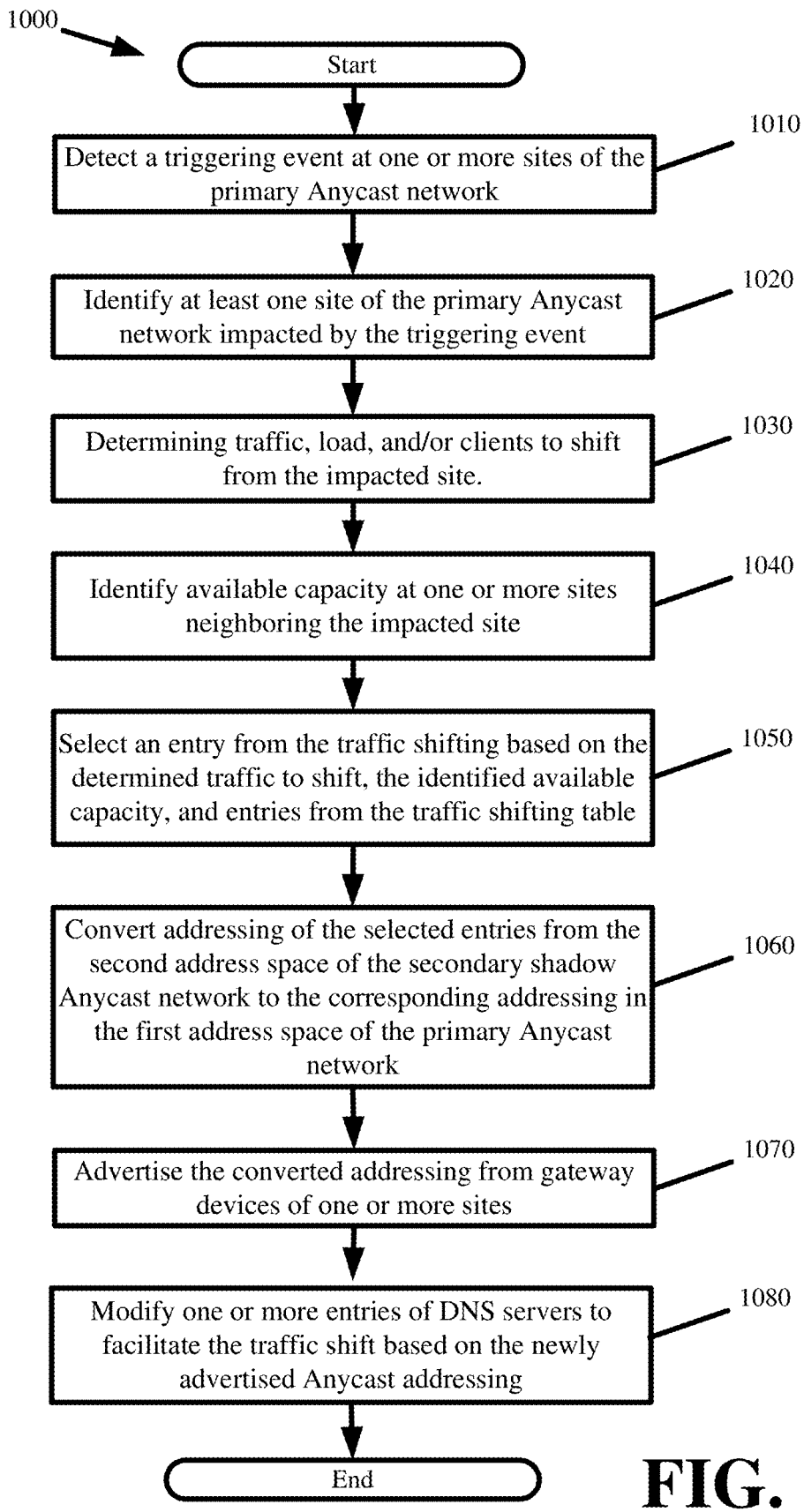
FIG. 10 presents a process for performing predictive Anycast traffic shaping in accordance with some embodiments described herein.

FIG. 10 presents a process 1000 for performing predictive Anycast traffic shaping in accordance with some embodiments described herein. Process 1000 may be performed by the traffic shaping device.

Process 1000 may include detecting (at 1010) a triggering event at one or more sites of the primary Anycast network. The triggering event may be detected in response to a network or site failure, one or more servers in a site being taken offline for maintenance, repair, and/or other reasons, excess demand at one or more sites, and/or other reasons. For instance, a live event that is specific to a particular region may create excess demand at a site that primarily serves clients in the particular region.

Process 1000 may include identifying (at 1020) at least one site of the primary Anycast network that is impacted by the triggering event. The identified site(s) may be a site that requires some or all traffic that is routed to that site to be shifted and routed to one or more other sites.

Process 1000 may include determining (at 1030) traffic, load, and/or clients to shift from the impacted site. Generally, process 1000 may determine (at 1030) an overall percentage of load to shift away from the impacted site. More specifically, process 1000 may determine (at 1030) a subset of clients (e.g., client IP addresses, device types, clients in different geographic or service regions, etc.), requests, AS numbers, and/or other traffic identifiers to shift away from the impacted site. In some embodiments, traffic shaping device 910 may identify an amount of traffic, load, and/or clients that deviate the impacted site from its steady state. For instance, traffic shaping device 910 may identify that the impacted site is experiencing 5% load in excess of a steady state load threshold. In some embodiments, traffic shaping device 910 may identify a subset of clients that are suspected of attacking the impacted site with a distributed denial of service (DDoS) or other attack.

Process 1000 may include identifying (at 1040) available capacity at one or more sites neighboring the impacted site. For instance, a first site may be operating at 95% of capacity, and a neighboring second site may be operating at 40% of capacity. Accordingly, the second site may be identified to have sufficient capacity to absorb some amount of traffic, load, and/or clients that are shifted away from the first site in order to restore the first site to a steady state (e.g., 80% of capacity).

Process 1000 may then include selecting (at 1050) an entry from the traffic shifting based on the determined (at 1030) traffic to shift, the identified (at 1040) available capacity at the one or more neighboring sites, and entries from the traffic shifting table that shift at least the determined amount of traffic from the impacted site to one or more sites with available capacity to handle the shifted traffic.

The traffic shifting table may include different entries that individually or collectively produce the desired traffic shift, and performance characteristics associated with each shift. For instance, process 1000 may determine (at 1030) that 15% of traffic is to be shifted away from a first site of the primary Anycast network, may identify (at 1040) each of second and third sites that are geographically proximate to the first site as having available capacity for the 15% of traffic, and the traffic shifting table may include a first entry for shifting 20% of traffic from the first site to a second site with an additional 10 milliseconds (10 ms) of latency experienced by the shifted clients, and a second entry for shifting 25% of traffic from the first site to a third site with an additional 8 ms of latency experienced by the shifted clients. In this example, process 1000 may select (at 1050) the third site to receive 25% of traffic from the first site because the clients will experience less of a performance impact by being shifted to the third site than the second site, even though more traffic is being shifted. In some embodiments, the traffic shifting table may include entries that shift traffic from one site equally or unequally to two or more sites. For instance, and continuing with the example above, the mapping table may include a third entry for shifting 5% of traffic from the first site to the second site and 10% of traffic from the first site to the third site. Process 1000 may select (at 1050) this third entry over the second entry to avoid shifting too much traffic to the third site, while still maximizing performance for the affected clients.

Process 1000 may include converting (at 1060) the addressing of the selected one or more entries from the second address space of the secondary shadow Anycast network to the corresponding addressing in the first address space of the primary Anycast network. Process 1000 may include advertising (at 1070) the converted addressing from at least the gateway devices of the one or more sites that traffic is shifted away from and/or the one or more sites that are receiving the shifted traffic. In some embodiments, the converted addressing may be provided to and advertised from gateway devices at each site of the target Anycast network.

In some embodiments, process 1000 may also include modifying (at 1080) one or more entries of DNS servers to facilitate the traffic shift based on the newly advertised Anycast addressing. For instance, traffic shaping device 910 may create DNS records for newly advertised specific routes (e.g., an Anycast address with a larger address prefix) that are within previously advertised cover routes (e.g., the Anycast address with a smaller address prefix).

In response to the changes to the advertised Anycast addresses of the primary Anycast network, the routers within the network will produce traffic shifts in the primary Anycast network from the one or more impacted sites to the one or more sites with available capacity. The resulting traffic shifts may be about equal to the predetermined traffic shifts observed between the same sites in the secondary shadow Anycast network when advertising the second set of addresses associated with the selected one or more entries of the traffic shifting table.

Although process 1000 is described for restoring a steady state of the primary Anycast network, traffic shaping device 910 may use the results of the secondary shadow Anycast network (e.g., traffic shifting table) to prevent network attacks from a subset of users. For instance, traffic shaping device 910 may detect a subset of clients that issue malicious traffic to one or more sites 215 via Anycast addressing of the first set of addresses, and may block that subset of clients via DNS record change and a specific route within a cover route that routes the subset of clients to an inactive site 215. Traffic shaping device 910 may also use the results of the secondary shadow Anycast network (e.g., traffic shifting table) for capacity planning. For instance, when creating a new site for the primary Anycast network, traffic shaping device 910 may use the results from the secondary shadow Anycast network to predetermine the amount of traffic that will be routed to the new site. Traffic shaping device 910 can then shift additional traffic to or remove some traffic from the new site depending on the available resources of the new site.

Figure 11:
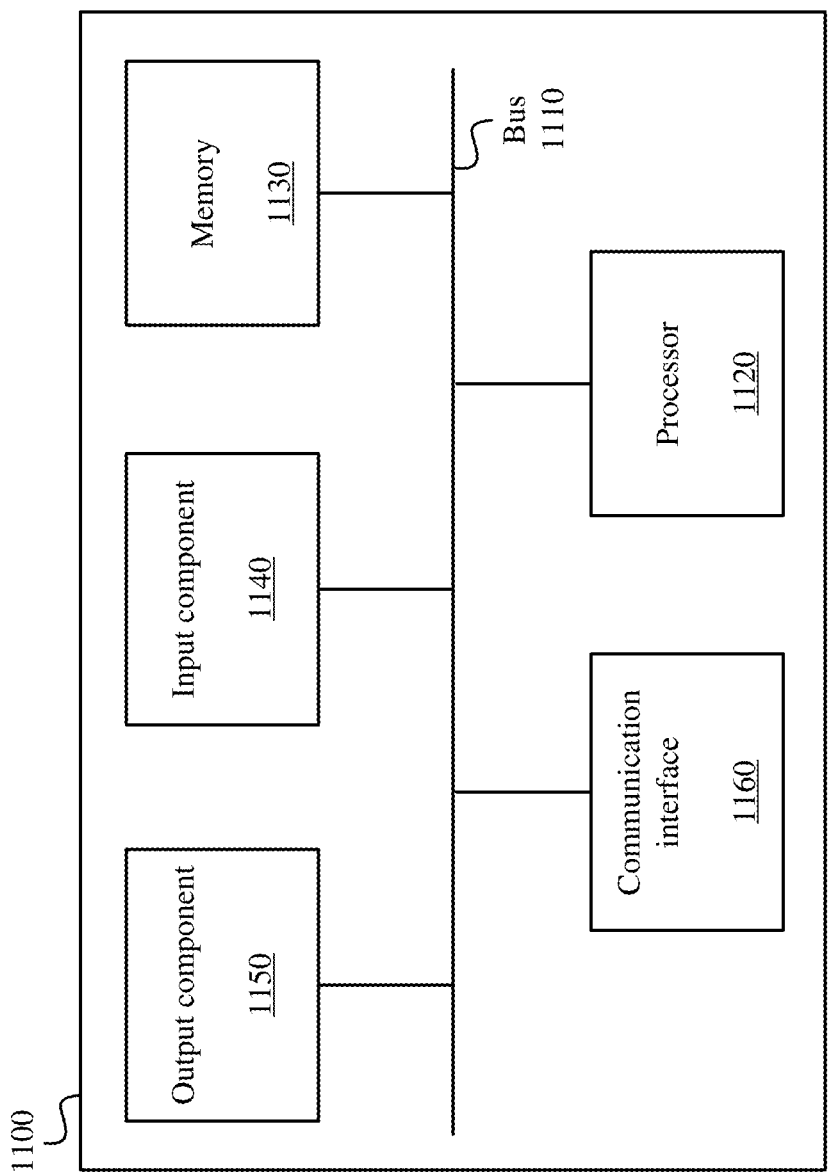
FIG. 11 illustrates a computer system or server with which some embodiments are implemented.

FIG. 11 is a diagram of example components of device 1100. Device 1100 may be used to implement certain of the devices described above (e.g., route injector 420, catchment device 430, and/or traffic shaping device 910). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
    advertising a first set of addresses with one or more variations and a second set of addresses without the one or more variations from at least a first site;
    determining different load fluctuations at the first site after advertising each of the first set of addresses with the one or more variations from at least the first site;
    detecting an excess load at the first site resulting from requests that are directed to the second set of addresses; and
    modifying said advertising of the second set of addresses from the first site by advertising one or more addresses of the second set of addresses with a variation that is derived from a particular variation of the first set of addresses, wherein the particular variation of the first set of addresses produced a particular load fluctuation in proportion to the excess load.

2. The method of claim 1, further comprising:
    advertising, from a second site, the first set of addresses, wherein the first set of addresses are in a first address space that is not exposed to devices that submit the requests and the second set of addresses are in a second address space that is exposed to the devices,
    and wherein the first set of addresses comprises a different network subnet, address block, address prefix, or range of Internet Protocol ("IP") addresses than the second set of addresses.

3. The method of claim 1, wherein determining the different load fluctuations comprises:
    performing a catchment measurement at the first site after advertising each variation of the of the first set of addresses;
    mapping each variation in the first set of addresses and a load fluctuation detected in the catchment measurement resulting from that variation to a corresponding variation in the second set of addresses.

4. The method of claim 1, wherein determining the different load fluctuations comprises:
    monitoring the load fluctuations that result at the first site from advertising each variation of the first set of addresses from at least the first site while continuing to advertise the second set of addresses unchanged.

5. The method of claim 4, wherein modifying said advertising of the second set of addresses comprises:
    determining that the particular load fluctuation created as a result of the particular variation to the first set of addresses is sufficient to resolve the excess load at the first site;
    mapping changes to the first set of addresses that produced the particular variation to changes in the one or more addresses of the second set of addresses; and
    changing the one or more addresses in the second set of addresses that are advertised from the first site.

6. The method of claim 1, wherein modifying said advertising of the second set of addresses comprises:
    providing test traffic to measure the load fluctuations at the first site that result from advertising each variation of the first set of addresses, while continuing to advertise the second set of addresses; and
    mapping the particular variation of the first set of addresses to changes in the one or more addresses of the second set of addresses in response to the particular load fluctuation being sufficient to resolve the excess load.

7. The method of claim 1 further comprising:
    receiving a first set of requests, that are directed to the one or more addresses, at the first site before said modifying; and
    shifting a second set of requests, that are directed to the one or more addresses, away from the first site to a second site after said modifying.

8. The method of claim 7, wherein modifying said advertising of the second set of addresses comprises:
    indicating that the one or more addresses are not accessible at the first site and are accessible at the second site by withdrawing advertisements of the one or more addresses from the first site and continuing to advertise the one or more addresses from the second site.

9. The method of claim 7, wherein the second set of requests generate the excess load at the first site.

10. The method of claim 1, wherein modifying said advertising of the second set of addresses comprises:
    advertising the second set of addresses from the first site with the one or more addresses removed or modified from said advertising.

11. The method of claim 1 further comprising:
    advertising the second set of addresses from a second site; and
    wherein modifying said advertising of the second set of addresses comprises:
        removing the one or more addresses from the second set of addresses being advertised from the first site;
        continuing said advertising of the second set of addresses with the one or more addresses from the second site.

12. The method of claim 1 further comprising:
    advertising the second set of addresses from a second site; and
    wherein modifying said advertising of the second set of addresses comprises:
        modifying said advertising of the second set of addresses from the first site by increasing a network path length associated with accessing the one or more addresses from the first site;
        continuing said advertising of the second set of addresses from the second site with a network path length associated with accessing the one or more addresses from the second site being less than the network path length associated with accessing the one or more addresses from the first site.

13. The method of claim 1 further comprising:
receiving a first plurality of requests that create the excess load at the first site before advertising the one or more addresses with the variation;
receiving a second plurality of requests that create an acceptable load at the first site after advertising the one or more addresses with the variation; and
receiving a third plurality of requests that shift the excess load from the first site to a second site after advertising the one or more addresses with the variation.

14. The method of claim 1 further comprising:
shifting the excess load from the first site to a second site as a result of requests that are directed to the one or more addresses routing to the second site, instead of the first site, after advertising the one or more addresses with the variation.

15. The method of claim 1 further comprising:
deterministically shifting traffic equaling the excess load from the first site to a second site in response to advertising the one or more addresses with the variation.

16. A system comprising:
one or more processors configured to:
advertise a first set of addresses with one or more variations and a second set of addresses without the one or more variations from at least a first site;
determine different load fluctuations at the first site after advertising each of the first set of addresses with the one or more variations from at least the first site;
detect an excess load at the first site resulting from requests that are directed to the second set of addresses; and
modify said advertising of the second set of addresses from the first site by advertising one or more addresses of the second set of addresses with a variation that is derived from a particular variation of the first set of addresses, wherein the particular variation of the first set of addresses produced a particular load fluctuation in proportion to the excess load.

17. The system of claim 16, wherein modifying said advertising of the second set of addresses comprises:
advertising the second set of addresses from the first site with the one or more addresses removed or modified from said advertising.

18. The system of claim 16, wherein the one or more processors are further configured to:
advertise the second set of addresses from a second site; and
wherein modifying said advertising of the second set of addresses comprises:
removing the one or more addresses from the second set of addresses being advertised from the first site;
continuing said advertising of the second set of addresses with the one or more addresses from the second site.

19. The system of claim 16, wherein the one or more processors are further configured to:
advertise the second set of addresses from a second site; and
wherein modifying said advertising of the second set of addresses comprises:
modifying said advertising of the second set of addresses from the first site by increasing a network path length associated with accessing the one or more addresses from the first site;
continuing said advertising of the second set of addresses from the second site with a network path length associated with accessing the one or more addresses from the second site being less than the network path length associated with accessing the one or more addresses from the first site.

20. A non-transitory computer-readable medium, storing a set of processor-executable instructions, which, when executed by one or more processors, cause the one or more processors to:
advertise a first set of addresses with one or more variations and a second set of addresses without the one or more variations from at least a first site;
determine different load fluctuations at the first site after advertising each of the first set of addresses with the one or more variations from at least the first site;
detect an excess load at the first site resulting from requests that are directed to the second set of addresses; and
modify said advertising of the second set of addresses from the first site by advertising one or more addresses of the second set of addresses with a variation that is derived from a particular variation of the first set of addresses, wherein the particular variation of the first set of addresses produced a particular load fluctuation in proportion to the excess load.

* * * * *